US011326687B1

(12) United States Patent
Ghatti et al.

(10) Patent No.: US 11,326,687 B1
(45) Date of Patent: May 10, 2022

(54) AXLE ASSEMBLY HAVING LUBRICANT DISTRIBUTION FEATURES

(71) Applicant: ArvinMeritor Technology, LLC, Troy, MI (US)

(72) Inventors: Chetankumar Ghatti, Troy, MI (US); Mark Smith, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/122,826

(22) Filed: Dec. 15, 2020

(51) Int. Cl.
| | | |
|---|---|---|
| *F16H 57/04* | (2010.01) | |
| *F16H 57/037* | (2012.01) | |
| *B60K 1/00* | (2006.01) | |
| *B60K 17/08* | (2006.01) | |
| *B60K 17/16* | (2006.01) | |
| *F16H 37/04* | (2006.01) | |
| *F16H 57/02* | (2012.01) | |

(52) U.S. Cl.
CPC .......... *F16H 57/0484* (2013.01); *B60K 1/00* (2013.01); *B60K 17/08* (2013.01); *B60K 17/16* (2013.01); *F16H 37/042* (2013.01); *F16H 57/037* (2013.01); *F16H 57/0423* (2013.01); *F16H 57/0483* (2013.01); *B60K 2001/001* (2013.01); *F16H 2057/02034* (2013.01); *F16H 2057/02052* (2013.01); *F16H 2702/02* (2013.01)

(58) Field of Classification Search
CPC .. F16H 57/0484; F16H 37/042; F16H 57/037; F16H 57/0423; F16H 57/0483; F16H 2057/02034; F16H 2057/02052; F16H 2702/02; F16H 57/0427; F16H 57/043; B60K 1/00; B60K 17/08; B60K 17/16; B60K 2001/001

See application file for complete search history.

(56) References Cited

U.S. PATENT DOCUMENTS

| | | | |
|---|---|---|---|
| 3,631,741 | A | 1/1972 | Kelbel |
| 4,480,492 | A | 11/1984 | Fujioka |
| 8,858,379 | B2 | 10/2014 | Keeney et al. |
| 10,962,058 | B2 * | 3/2021 | Tsurumi .............. F16C 33/6659 |
| 2011/0230292 | A1 | 9/2011 | Komatsu et al. |
| 2013/0145879 | A1 | 6/2013 | Nakamura et al. |
| 2019/0054816 | A1 | 2/2019 | Garcia et al. |
| 2019/0054817 | A1 | 2/2019 | Garcia et al. |
| 2019/0054818 | A1 | 2/2019 | Garcia et al. |

(Continued)

FOREIGN PATENT DOCUMENTS

| | | | | |
|---|---|---|---|---|
| CN | 111750045 A | * | 10/2020 | |
| DE | 102017220901 A1 | * | 5/2019 | .......... F16H 57/043 |

(Continued)

OTHER PUBLICATIONS

Partial European Search Report dated Jul. 9, 2021 for related European application No. 21159487.4; 13 pages.

(Continued)

*Primary Examiner* — Dirk Wright

(74) *Attorney, Agent, or Firm* — Brooks Kushman PC

(57) ABSTRACT

An axle assembly having an electric motor module that may be operatively connected to a planetary gear set. A lubricant catching ring may be mounted to a planet gear carrier of the planetary gear set. A deflector may deflect lubricant through a lubricant opening in a wall of a shift mechanism housing.

20 Claims, 23 Drawing Sheets

(56) References Cited

U.S. PATENT DOCUMENTS

| | | | |
|---|---|---|---|
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Begov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |
| 2021/0317881 A1 * | 10/2021 | Kim | F16H 57/0473 |

FOREIGN PATENT DOCUMENTS

| | | | | |
|---|---|---|---|---|
| EP | 3029358 A1 * | 6/2016 | | F16H 57/0482 |
| EP | 3578842 A1 | 12/2019 | | |
| EP | E P-3879135 A2 * | 9/2021 | | |
| FR | 3071025 A1 * | 3/2019 | | F16H 57/0486 |
| JP | H0886348 A * | 4/1996 | | |
| JP | 5557147 B2 | 7/2014 | | |

OTHER PUBLICATIONS

Extended European Search Report dated Nov. 19, 2021 for related European application No. 21159487.4 14 pages.

* cited by examiner

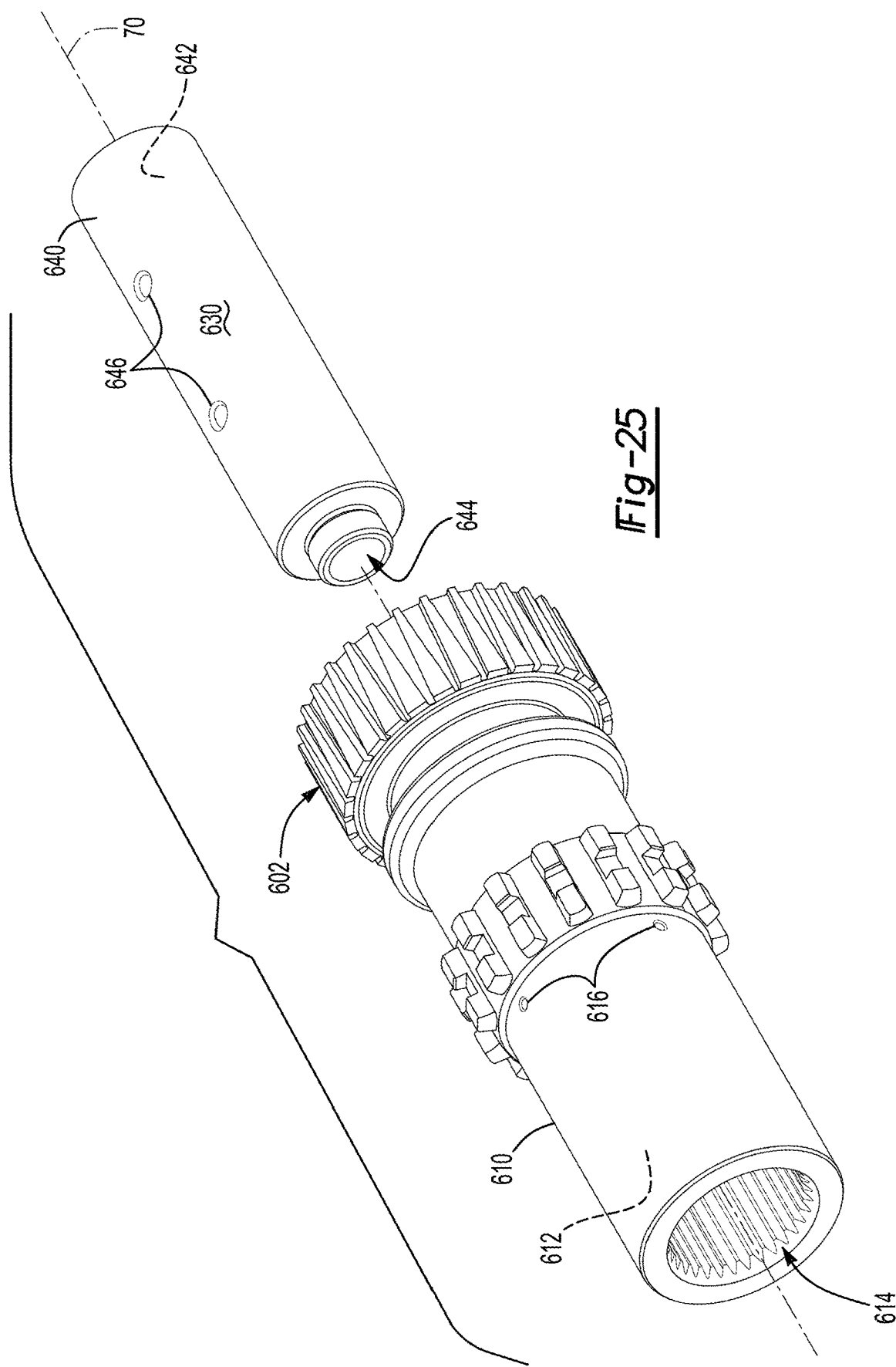

US 11,326,687 B1

AXLE ASSEMBLY HAVING LUBRICANT DISTRIBUTION FEATURES

TECHNICAL FIELD

This disclosure relates to an axle assembly that has an electric motor module that may be operatively connected to a planetary gear set. Lubricant distribution features may be provided to facilitate lubricant distribution, such as proximate the planetary gear set.

BACKGROUND

An axle assembly having an electric motor module is disclosed in U.S. Pat. No. 8,858,379.

SUMMARY

In at least one embodiment an axle assembly is provided. The axle assembly may include an electric motor module, a cover, and a planetary gear set. The electric motor module may be operatively connectable to a differential assembly. The electric motor module may have a motor housing that receives a rotor that is rotatable about an axis. The cover may be mounted to an end of the motor housing. The cover may receive the planetary gear set, which may be operatively connected to the rotor. The planetary gear set may include a planet gear carrier and a lubricant catching ring. The planet gear carrier may be rotatable about the axis and may rotatably support a planet gear that may mesh with a planetary ring gear and a sun gear. The planet gear carrier may have a first side that may face toward the cover. The lubricant catching ring may extend around the axis and may be mounted to the first side. The lubricant catching ring may define a lubricant catching ring hole. The lubricant catching ring may cooperate with the planet gear carrier to define a chamber that captures lubricant that passes through the lubricant catching ring hole.

In at least one embodiment an axle assembly is provided. The axle assembly may include an electric motor module, a cover, a planetary gear set, and a shift mechanism housing. The electric motor module may be operatively connectable to a differential assembly. The electric motor module may have a motor housing that receives a rotor that is rotatable about an axis. The cover may be mounted to an end of the motor housing. The cover may receive the planetary gear set, which may be operatively connected to the rotor. The shift mechanism housing may be disposed on the cover. The shift mechanism housing may have an inner housing side and a wall. The inner housing side may face toward the axis. The wall may extend from the inner housing side toward the axis and may receive a bearing assembly that may rotatably support the planet gear carrier. The wall may at least partially define a lubricant opening. A deflector may be mounted to the shift mechanism housing proximate the lubricant opening and is axially positioned between the planetary gear set and the wall. The deflector may direct lubricant through the lubricant opening.

BRIEF DESCRIPTION OF THE DRAWINGS

FIG. 25 is an exploded view of a shift collar and a support tube that may be provided with the axle assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
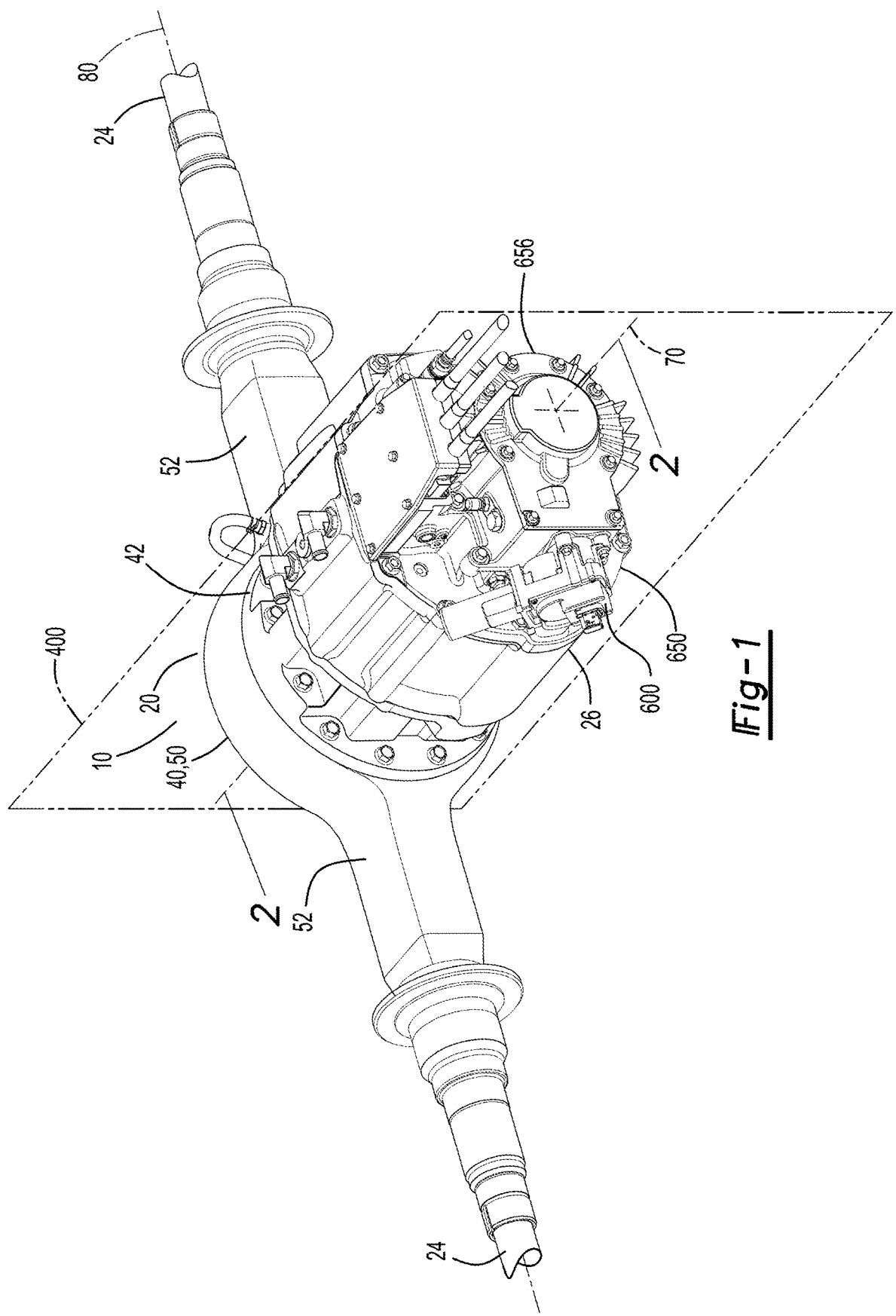
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 12:
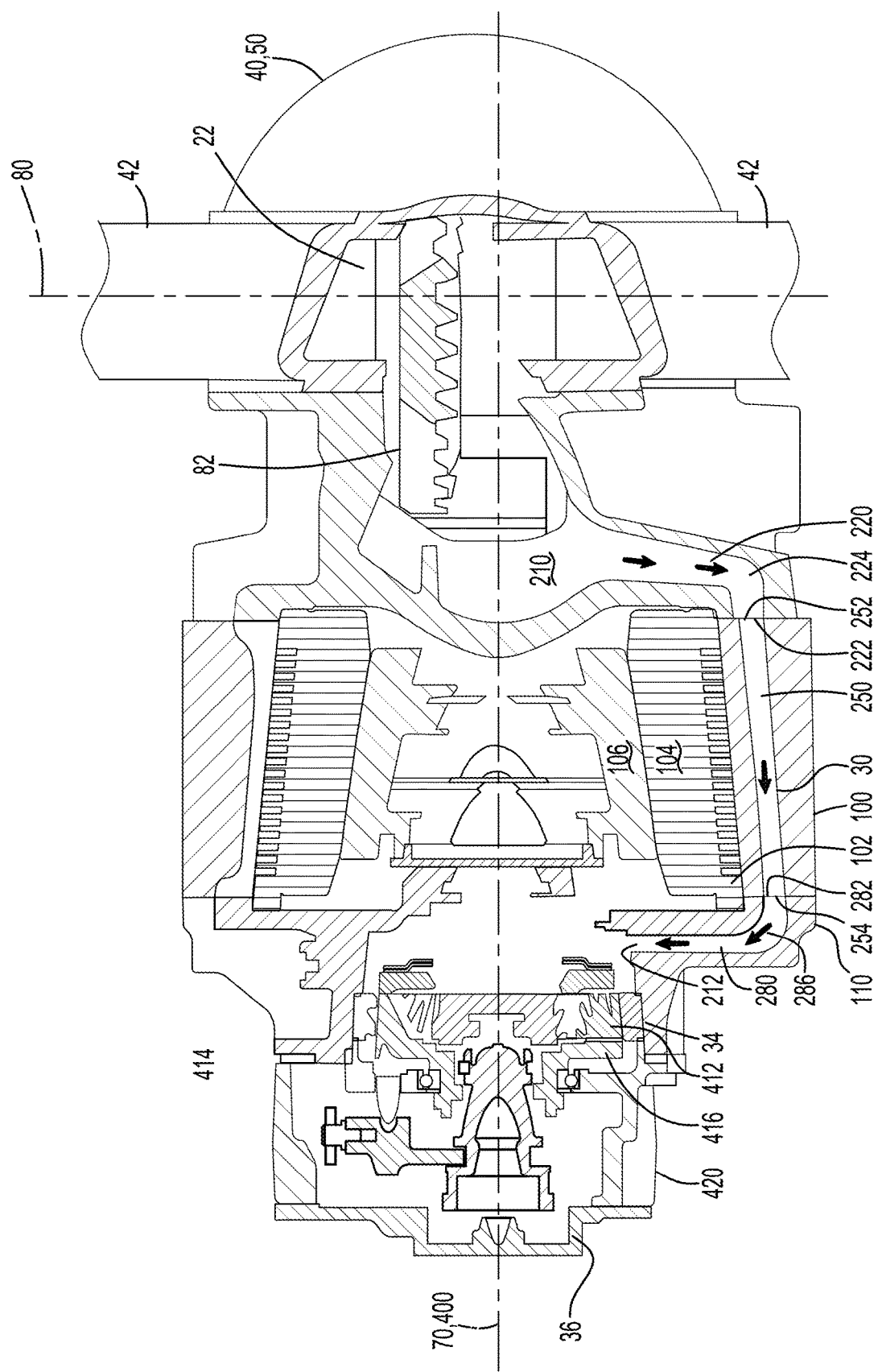
FIG. 12 is a section view of the axle assembly along section line 12-12.
Figure 14:
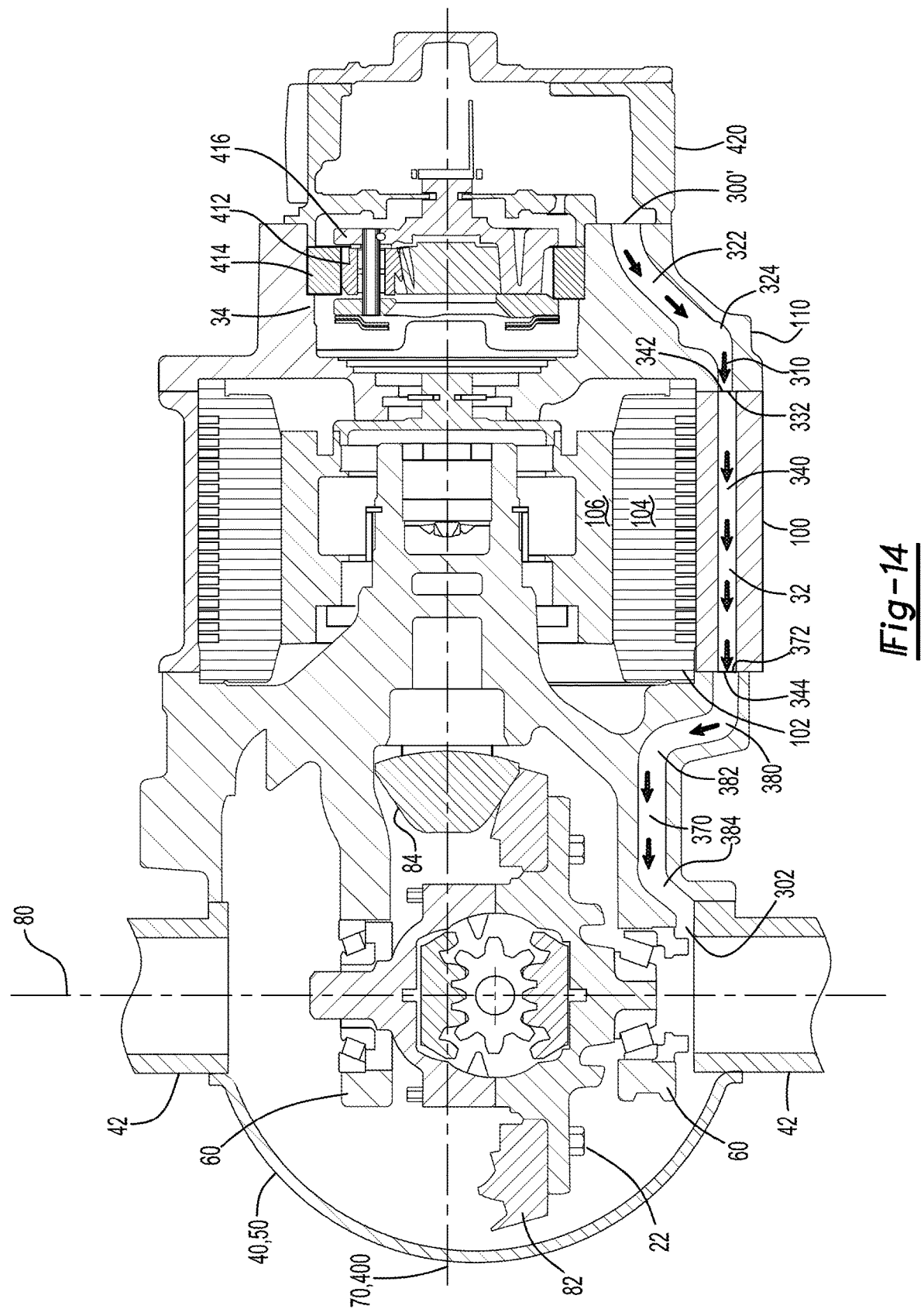
FIG. 14 is a section view of the axle assembly along section line 14-14 with axle shafts omitted for clarity.

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIGS. 12 and 14, the axle assembly 10 may also include a first lubricant passage 30, a second lubricant passage 32, a gear reduction module 34, a shift mechanism 36, or combinations thereof.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

Figure 2:
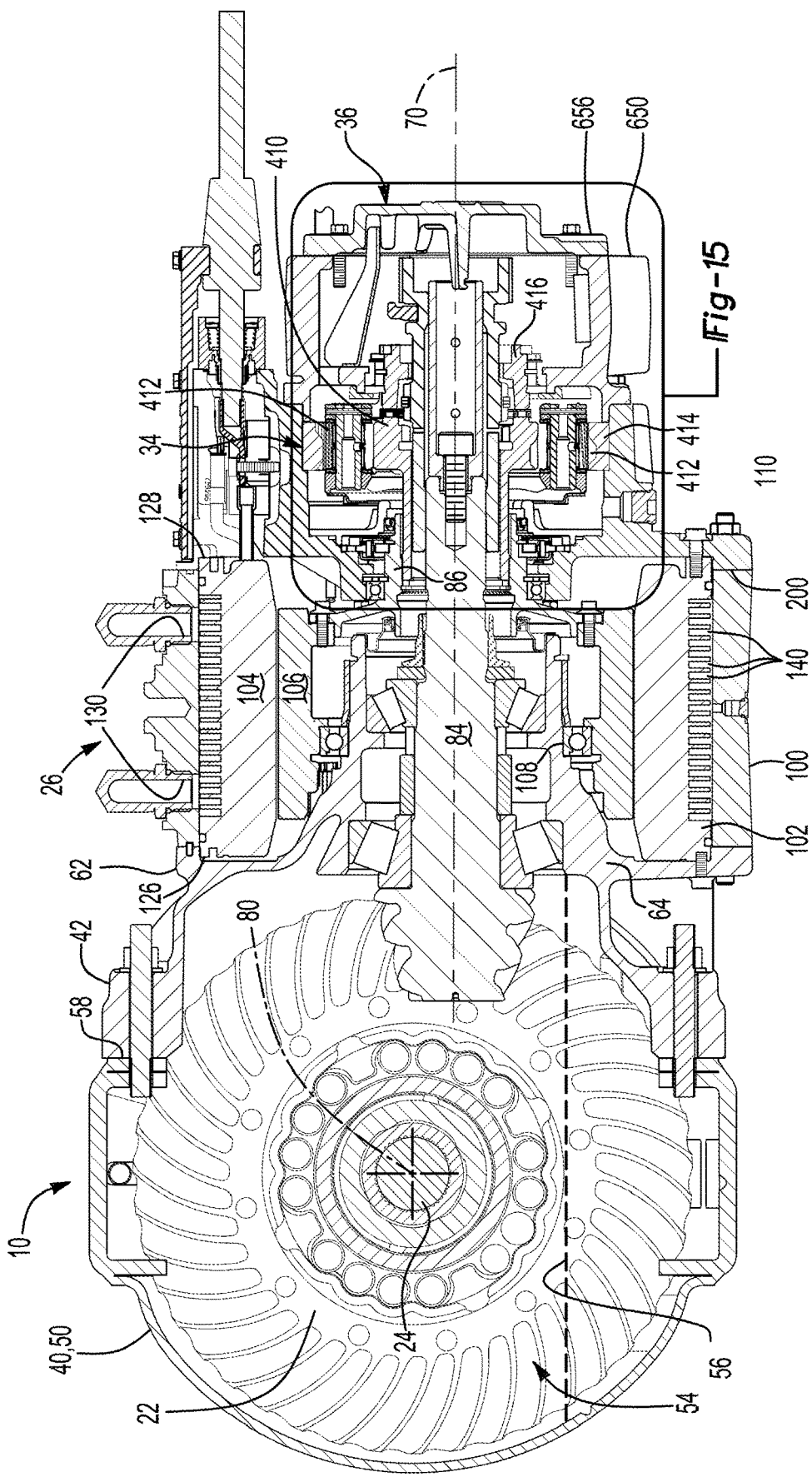
FIG. 2 is a section view of the axle assembly along section line 2-2.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 as will be discussed in more detail below.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. As is best shown with reference to FIGS. 2-4, the differential carrier 42 may include one or more bearing supports 60, a mounting flange 62, and a bearing support wall 64.

Figure 3:
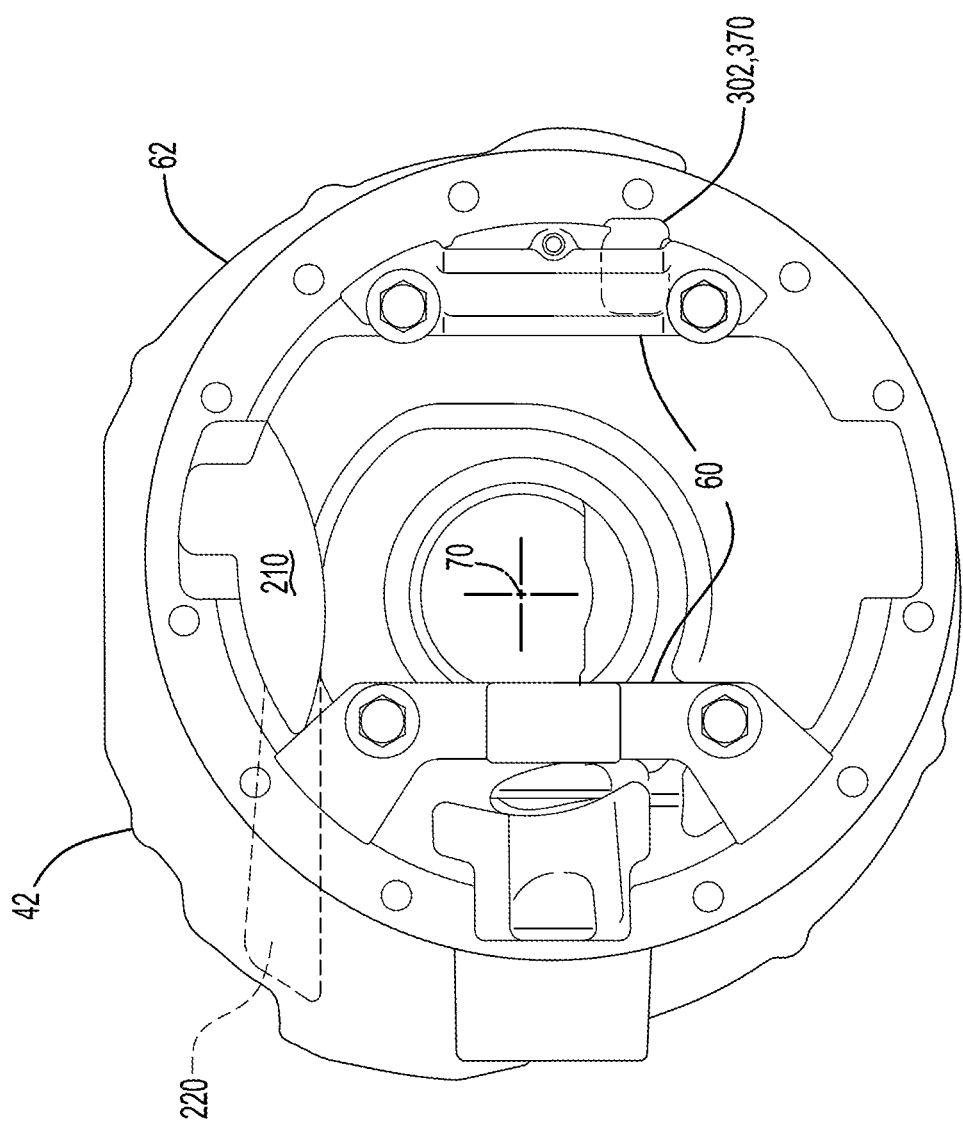
FIG. 3 is a side view of a differential carrier that may be provided with the axle assembly.

Referring primarily to FIGS. 2 and 3, a bearing support 60 may support a roller bearing assembly that may rotatably support the differential assembly 22. For example, two bearing supports 60 may be received in the center portion 50 and may be located proximate opposite sides of the differential assembly 22. The bearing support 60 may be provided in various configurations. For example, a bearing support 60 may include a pair of legs that extend from the differential carrier 42. A bearing cap may be mounted to the legs and may arch over a roller bearing assembly that may rotatably support the differential assembly 22. As another example, the bearing support 60 may be received in a roller bearing assembly, which in turn may support the differential assembly 22.

The mounting flange 62 may facilitate mounting of the electric motor module 26. The mounting flange 62 may be configured as a ring that may extend outward and away from an axis 70 and may extend around the axis 70. The mounting flange 62 may include a set of fastener holes that may be configured to receive a fastener that may secure the electric motor module 26 to the mounting flange 62.

Figure 4:
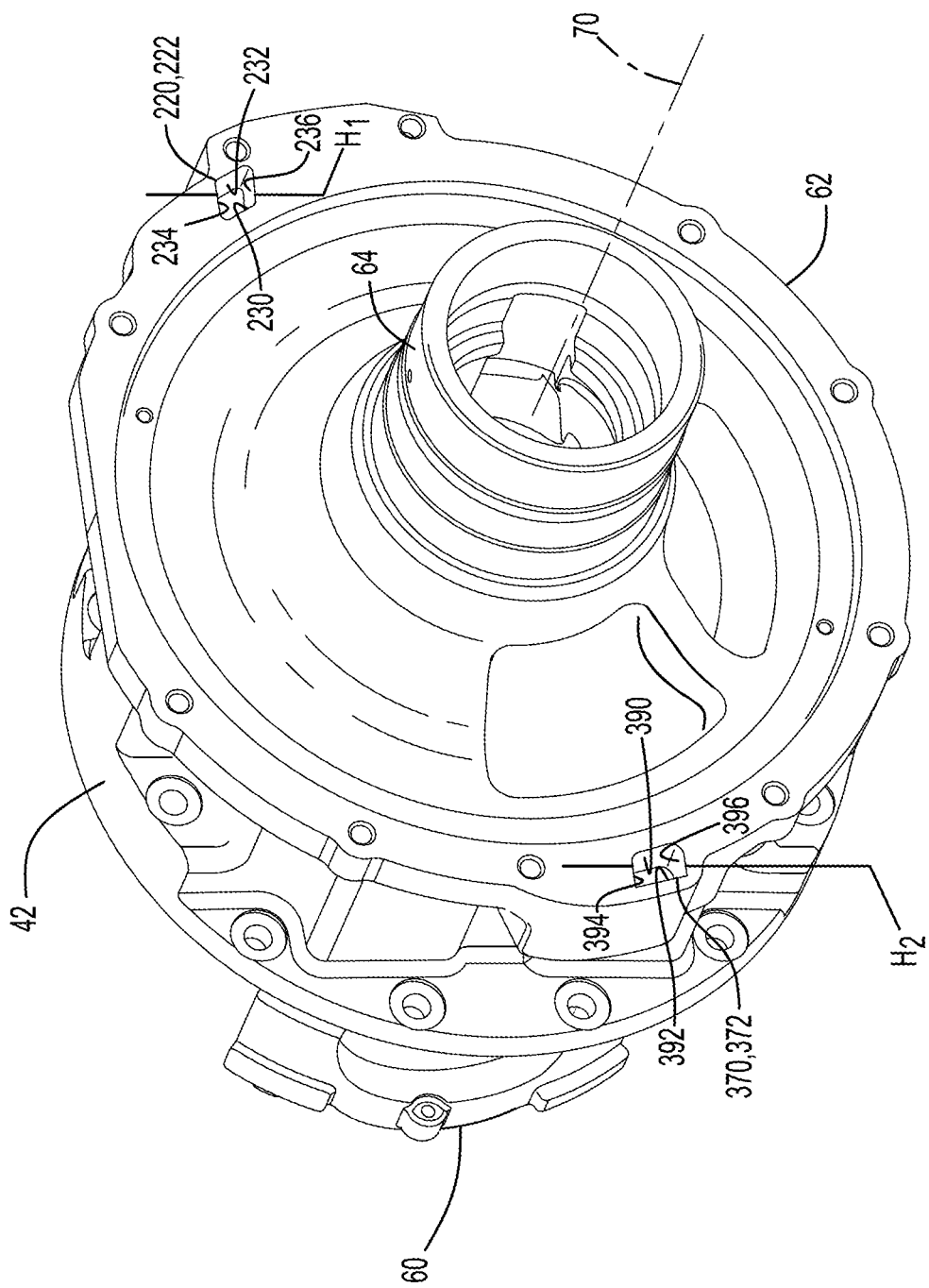
FIG. 4 is a perspective view of the differential carrier.

Referring to FIGS. 2 and 4, the bearing support wall 64 may support bearings that may rotatably support other components of the axle assembly 10. For example, the bearing support wall 64 may support bearings that may rotatably support a drive pinion 84, bearings that may rotatably support a rotor of the electric motor module 26, or both. The bearing support wall 64 may extend in an axial direction away from the axle housing 40 and may extend around the axis 70. The bearing support wall 64 may define a hole that may receive the drive pinion 84. The bearing support wall 64 may be integrally formed with the differential carrier 42 or may be a separate component that is fastened to the differential carrier 42.

Differential Assembly and Axle Shafts

Referring to FIGS. 2, 12, and 14, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth the mate or mesh with the teeth of a gear portion of a drive pinion 84. Accordingly, the differential assembly 22 may receive torque from the drive pinion via the ring gear 82 and transmit torque to the axle shafts 24.

The drive pinion 84 may provide torque to the ring gear 82. In an axle assembly that includes a gear reduction module 34, the drive pinion 84 may operatively connect the gear reduction module 34 to the differential assembly 22. In at least one configuration, the drive pinion 84 may be rotatable about the axis 70 and may be rotatably supported on another component, such as the bearing support wall 64.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26 may be mounted to the differential carrier 42 and may be operatively connectable to the differential assembly 22. For instance, the electric motor module 26 may provide torque to the differential assembly 22 via the drive pinion 84. The electric motor module 26 may be primarily disposed outside the differential carrier 42. In addition, the electric motor module 26 may be axially positioned between the axle housing 40 and the gear reduction module 34. In at least one configuration, the electric motor module 26 may include a motor housing 100, a coolant jacket 102, a stator 104, a rotor 106, at least one rotor bearing assembly 108, and a cover 110.

Figure 5:
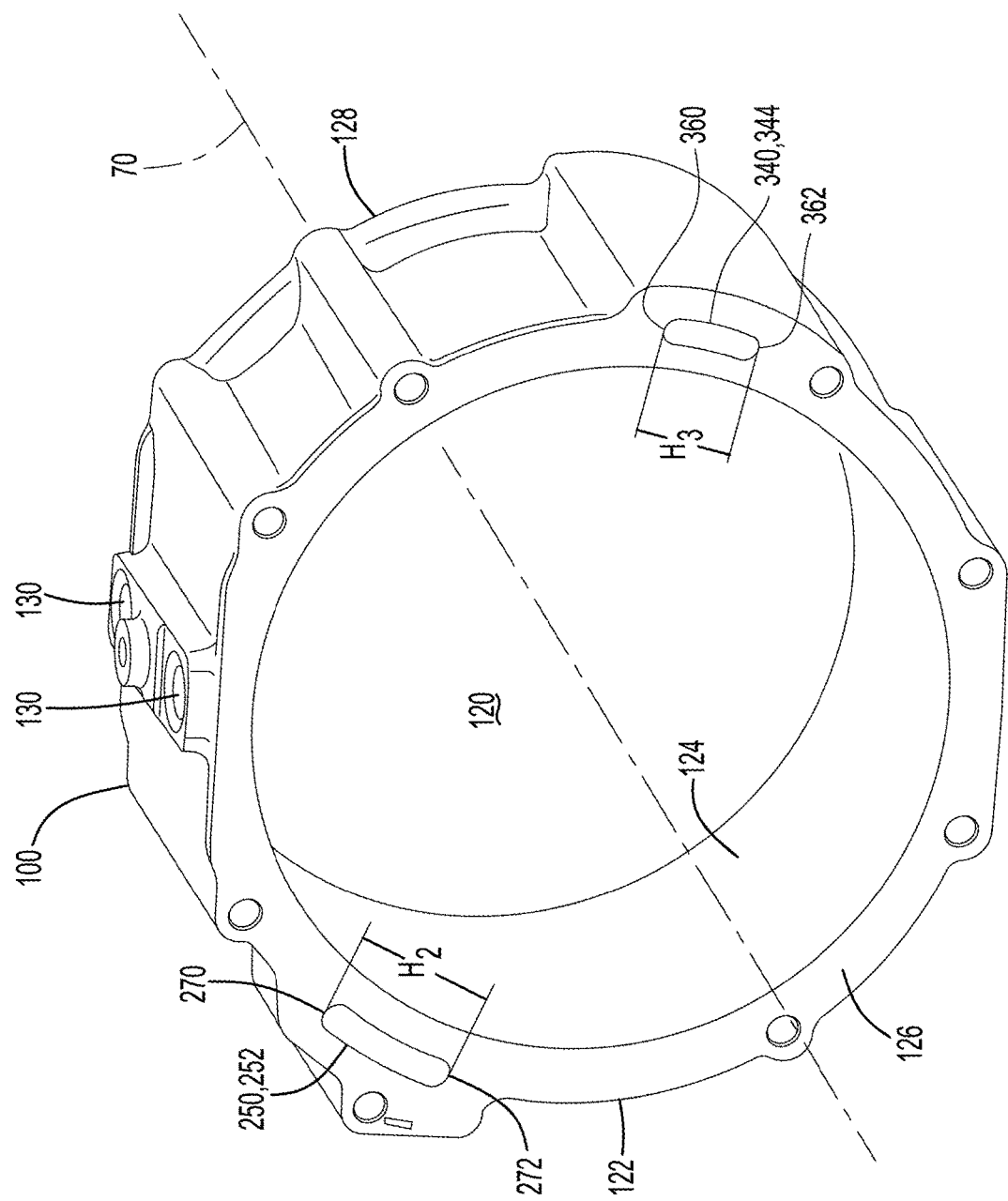
FIGS. 5 and 6 are perspective views of a motor housing that may be provided with the axle assembly.
Figure 6:
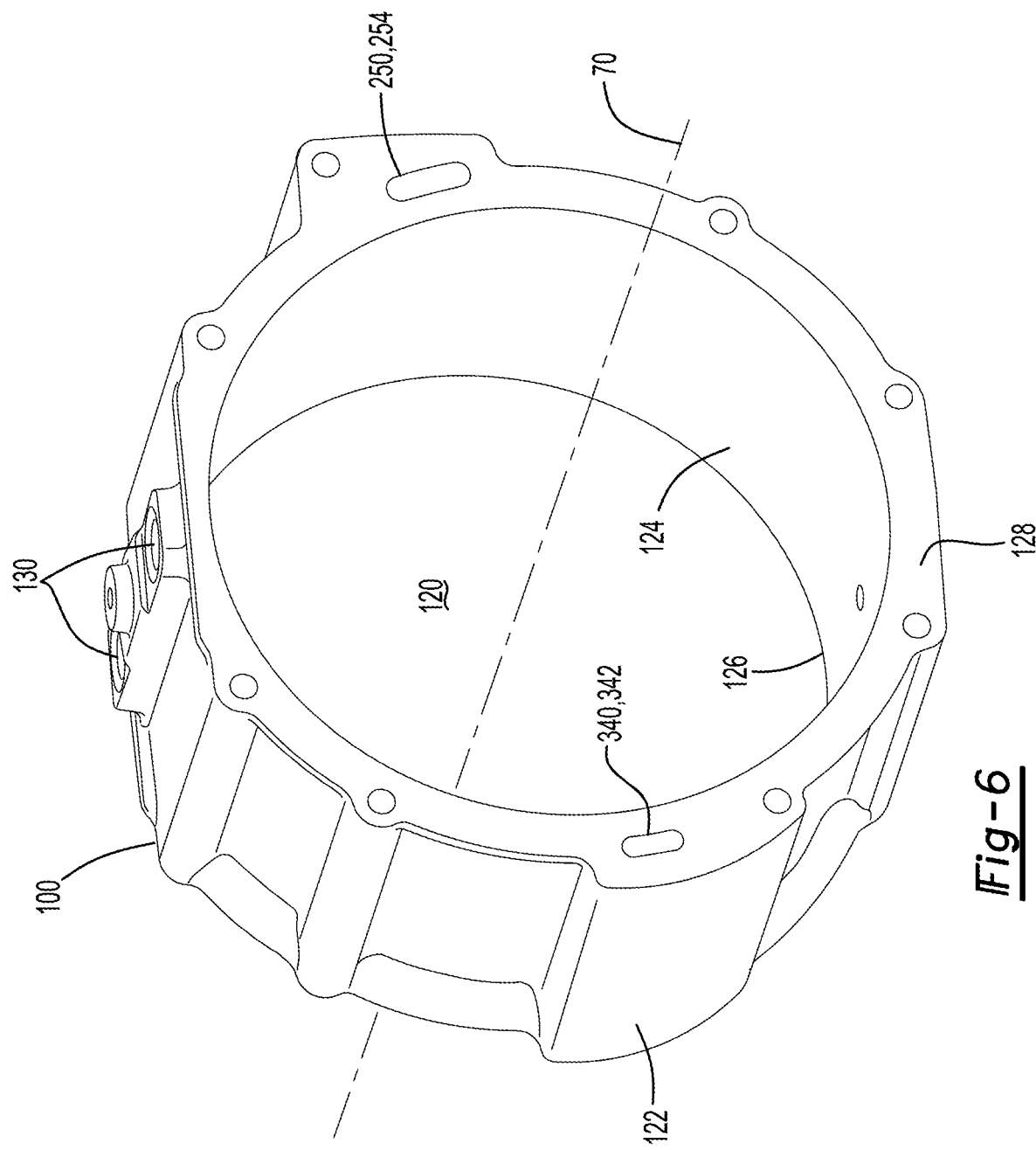
Figure 7:
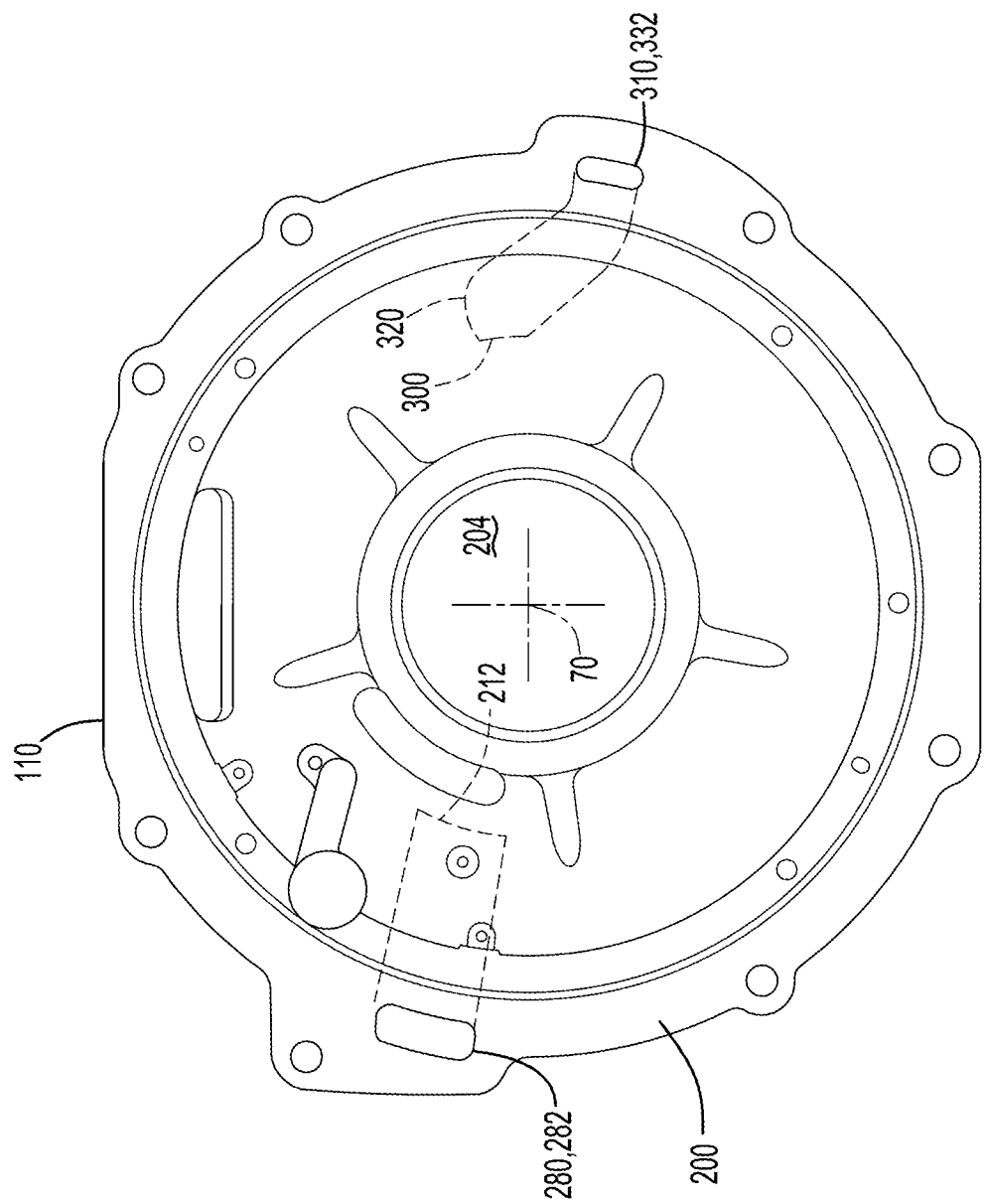
FIGS. 7 and 8 are opposing side views of a cover that may be provided with the axle assembly.

Referring to FIG. 2, the motor housing 100 may extend between the differential carrier 42 and the cover 110 and may be mounted to the differential carrier 42 and the cover 110. For example, the motor housing 100 may extend from the mounting flange 62 of the differential carrier 42 to the cover 110. As is best shown in FIGS. 5 and 6, the motor housing 100 may extend around the axis 70 and define a motor housing cavity 120. The motor housing cavity 120 may have a generally cylindrical configuration. As is best shown in FIG. 2, the motor housing 100 may extend continuously around and may be spaced apart from the bearing support wall 64 of the differential carrier 42. In at least one configuration and as is best shown in FIGS. 5 and 6, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. More specifically, the first end surface 126 may be disposed adjacent to the mounting flange 62 of the differential carrier 42. The motor housing 100 and the first end surface 126 may or may not be received inside the mounting flange 62.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as a through holes that may extend from the exterior side 122 to the interior side 124. The ports 130 may allow coolant, such as a fluid like water, a water/antifreeze mixture, or the like, to flow to and from the coolant jacket 102 as will be described in more detail below.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42 to the cover 110. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. A baffle may be provided with the coolant jacket 102 that may reverse the direction of coolant flow to help route coolant from the first port 130 to the second port 130.

The stator 104 may be received in the motor housing 100. For instance, the stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current. The rotor 106 may extend around and may be supported by the bearing support wall 64.

One or more rotor bearing assemblies 108 may rotatably support the rotor 106. For example, a rotor bearing assembly 108 may receive the bearing support wall 64 of the differential carrier 42 and may be received inside of the rotor 106. The rotor 106 may be operatively connected to the drive pinion 84. For instance, a coupling such as a rotor output flange 86 may operatively connect the rotor 106 to the gear reduction module 34, which in turn may be operatively connectable with the drive pinion 84.

Referring to FIGS. 2 and 7-10, the cover 110 may be mounted to the motor housing 100 and may be disposed opposite the axle housing 40 and the differential carrier 42. For example, the cover 110 may be mounted to an end of the motor housing 100, such as upon the second end surface 128 of the motor housing 100. The cover 110 may be spaced apart from and may not engage the differential carrier 42. The cover 110 may be provided in various configurations. In at least one configuration, the cover 110 may include a first side 200 and a second side 202. The first side 200 may face toward and may engage the motor housing 100. The second side 202 may be disposed opposite the first side 200. The second side 202 may face away from the motor housing 100 and may be disposed opposite the motor housing 100. Cover 110 may also include a motor cover opening 204 in configurations having a gear reduction module 34.

Figure 11:
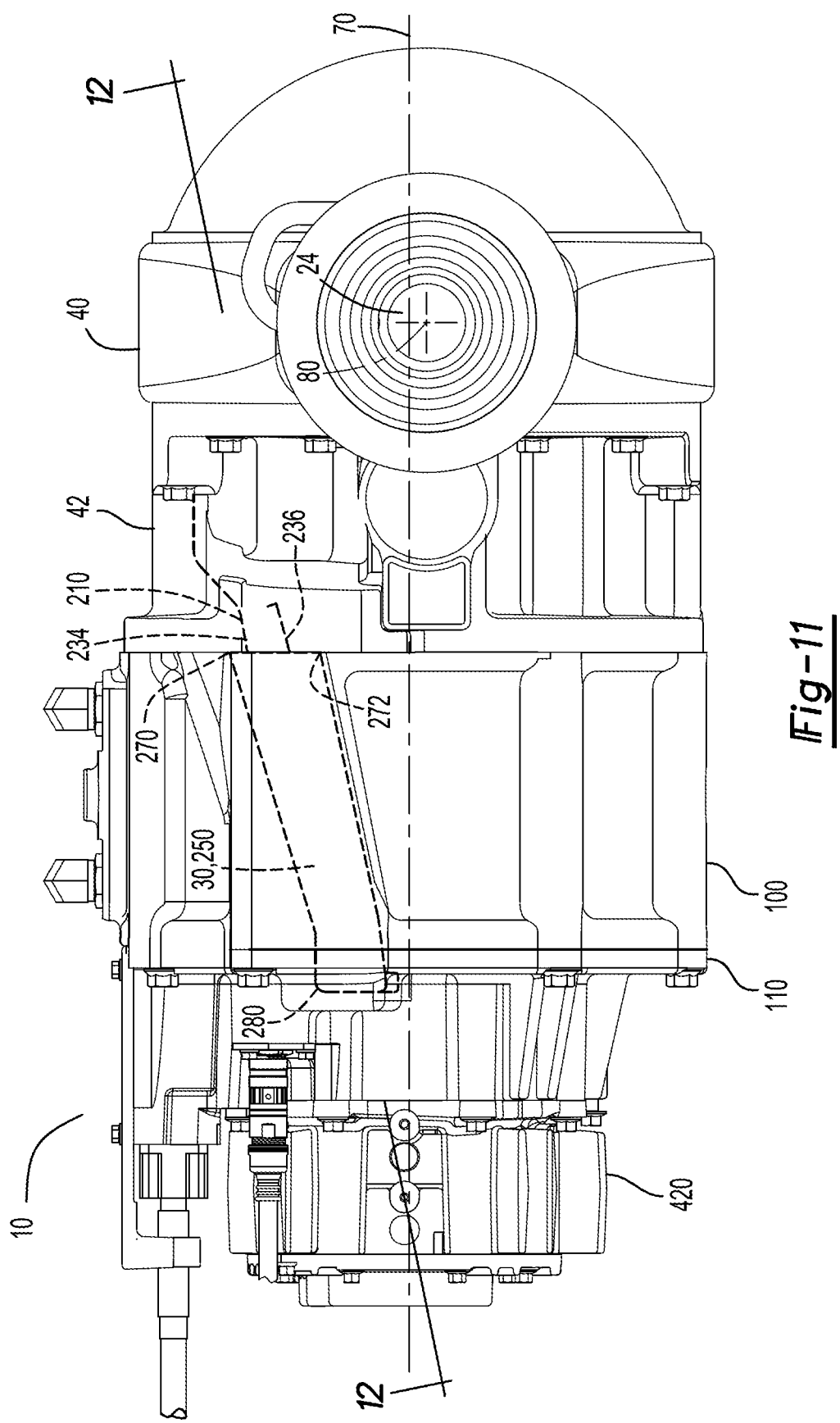
FIG. 11 is a side view of the axle assembly of FIG. 1.

Referring to FIGS. 11 and 12, the first lubricant passage 30 may route lubricant 56 from the axle housing 40 to help lubricate components that are disposed outside of the axle housing 40. The flow of lubricant 56 may be represented by the arrowed lines in FIG. 12. The first lubricant passage 30 may receive lubricant 56 that is splashed by the differential assembly 22, such as when the differential assembly 22 rotates about the differential axis 80. For example, the ring gear 82 may splash lubricant 56 from the sump portion 54 and some splashed lubricant may enter the first lubricant passage 30. The first lubricant passage 30 may deliver lubricant 56 to the gear reduction module 34, the shift mechanism 36, components that are located adjacent to or inside the cover 110, or combinations thereof. As an example, the first lubricant passage 30 may route lubricant from the axle housing 40 to the cover 110. In at least one configuration, the first lubricant passage 30 may be completely disposed above the axis 70. In addition, the first lubricant passage 30 may have at least one inlet 210 and at least one outlet 212.

The inlet(s) 210 may receive lubricant 56 from the axle housing 40 and may be disposed further above the axis 70 than the outlet(s) 212. As such, the first lubricant passage 30 may slope downward from the inlet(s) 210 toward or to the outlet(s) 212.

The outlet(s) 212 may be disposed at an end of the first lubricant passage 30 that is disposed opposite the inlet(s) 210. The outlet(s) 212 may be vertically positioned closer to the axis 70 than the inlet(s) 210.

The first lubricant passage 30 may be configured as a through hole that may extend through at least the motor housing 100. In at least one configuration, the differential carrier 42, the motor housing 100, and the cover 110 may cooperate to at least partially define the first lubricant passage 30. For instance, the first lubricant passage 30 may be at least partially defined by through holes in the differential carrier 42, the motor housing 100, and the cover 110. These through holes may be fluidly connected to each other. The text below primarily describes the first lubricant passage 30 that may be defined by these three components.

Referring to FIGS. 3, 4, and 12, the differential carrier 42 may define the inlet 210 and a first portion 220 of the first lubricant passage 30. The first portion 220 may also be referred to as the portion of the first lubricant passage 30 that is defined by the differential carrier 42. The inlet 210 and the first portion 220 may be disposed proximate the top of the differential carrier 42. In at least one configuration, the inlet 210 and the first portion 220 may be disposed above the case or housing of the differential assembly 22. The first portion 220 may extend from the inlet 210 to a first outlet port 222, which is best shown in FIG. 4. For example, the first portion 220 may extend in a generally horizontal direction from the inlet 210 toward an exterior side of the differential carrier 42 or to the left from the perspective shown in FIG. 3. The first portion 220 may then change direction at a bend 224, which is best shown in FIG. 12, and may extend toward the mounting flange 62 and the motor housing 100 and to the first outlet port 222.

Referring to FIG. 4, the region of the first portion 220 that extends from the bend 224 to the first outlet port 222 may have an inner wall 230 and an outer wall 232. The inner wall 230 may be disposed closer to the axis 70 than the outer wall 232. The inner wall 230, the outer wall 232, or both may extend along an arc. For instance, the inner wall 230, the outer wall 232, or both may have a portion that may be radially disposed with respect to the axis 70.

The first outlet port 222 may also have a top wall 234 and a bottom wall 236. The top wall 234 may be disposed above the bottom wall 236 and may extend from the inner wall 230 to the outer wall 232. The bottom wall 236 may be spaced apart from the top wall 234 and may extend from the inner wall 230 to the outer wall 232. The first outlet port 222 may have a height $H_1$ that may extend from the top wall 234 to the bottom wall 236.

Referring to FIGS. 5, 6 and 12, the motor housing 100 may define a second portion 250 of the first lubricant passage 30. The second portion 250 may also be referred to as the portion of the first lubricant passage 30 that is defined by the motor housing 100.

The second portion 250 may be disposed between the exterior side 122 and the interior side 124 of the motor housing 100. In addition, the second portion 250 may be radially positioned further from the axis 70 than the stator 104 and the coolant jacket 102. For instance, the second portion 250 may be disposed between the coolant jacket 102 and the exterior side 122 of the motor housing 100. The second portion 250 may extend substantially parallel to the axis 70. It is noted that the second portion 250 extends substantially parallel to the axis 70 in FIG. 12 but appears to be tapered from the differential carrier 42 to the cover 110 due to the angularity of the section plane and the curvature of the second portion 250. The second portion 250 may have a second inlet port 252 and a second outlet port 254 and may extend from the second inlet port 252 to the second outlet port 254.

The second inlet port 252 may be disposed at a first end surface 126 of the motor housing 100. In at least one configuration, the second inlet port 252 may be at least partially disposed above the second outlet port 254. The second inlet port 252 may be disposed adjacent to the first outlet port 222 and may be fluidly connected to the first outlet port 222. In at least one configuration, the second inlet port 252 may have an upper end 270 and a lower end 272 as is best shown in FIG. 5.

The upper end 270 may be disposed at the top of the second inlet port 252.

The lower end 272 may be disposed opposite the upper end 270 and may be disposed proximate the bottom of the second inlet port 252. The second inlet port 252 may have a height $H_2$ that may extend from the upper end 270 to the lower end 272. The height $H_2$ of the second inlet port 252 may be greater than the height $H_1$ of the first outlet port 222. For instance, the upper end 270 may be disposed above and may be spaced apart from the top wall 234 of the first outlet port 222, the lower end 272 may be disposed below and may be spaced apart from the bottom wall 236 of the first outlet port 222, or both.

Providing a second inlet port 252 with a greater height than the first outlet port 222 may allow the motor housing 100 to be standardized while allowing the motor housing 100 to fluidly connect with different differential carrier designs that may position the first outlet port 222 at different locations. For instance, the top wall 234 of the first outlet port 222 may be positioned at a higher elevation or closer to the upper end 270 in configurations where the differential carrier 42 supports a larger differential assembly 22 or a differential assembly 22 having a larger diameter ring gear 82. Conversely, the bottom wall 236 of the first outlet port 222 may be positioned at a lower elevation or closer to the lower end 272 in configurations where the differential carrier 42 supports a smaller differential assembly 22 or a differential assembly 22 having a smaller diameter ring gear 82.

Referring to FIG. 6, the second outlet port 254 may be disposed at the second end surface 128 that may be disposed opposite the first end surface 126.

Referring to FIGS. 7-9 and 12, the cover 110 may define a third portion 280 of the first lubricant passage 30. The third portion 280 may also be referred to as the portion of the first lubricant passage 30 that is defined by the cover 110.

The third portion 280 may be configured as a through hole that may extend through the cover 110. As such, the third portion 280 may be disposed between an exterior side of the cover 110 and an interior side of the cover 110. The third portion 280 may extend from a third inlet port 282 to the outlet 212. Accordingly, the cover 110 may define the outlet 212 of the first lubricant passage 30 in at least one configuration.

The third inlet port 282 may be fluidly connected to the second outlet port 254. The third inlet port 282 may be disposed at an end of the cover 110 that may face toward and may engage the second end surface 128 of the motor housing 100. In at least one configuration, the third portion 280 may extend axially or substantially parallel to the axis 70 from the third inlet port 282 to a bend 286, which is best shown in FIG. 12. The third portion 280 may then change direction at the bend 286 and may extend toward the axis 70 and to the outlet 212. Lubricant 56 may exit the outlet 212 and may be provided to components that may be remotely positioned from the axle housing 40, such as the gear reduction module 34 and the shift mechanism 36.

Figure 13:
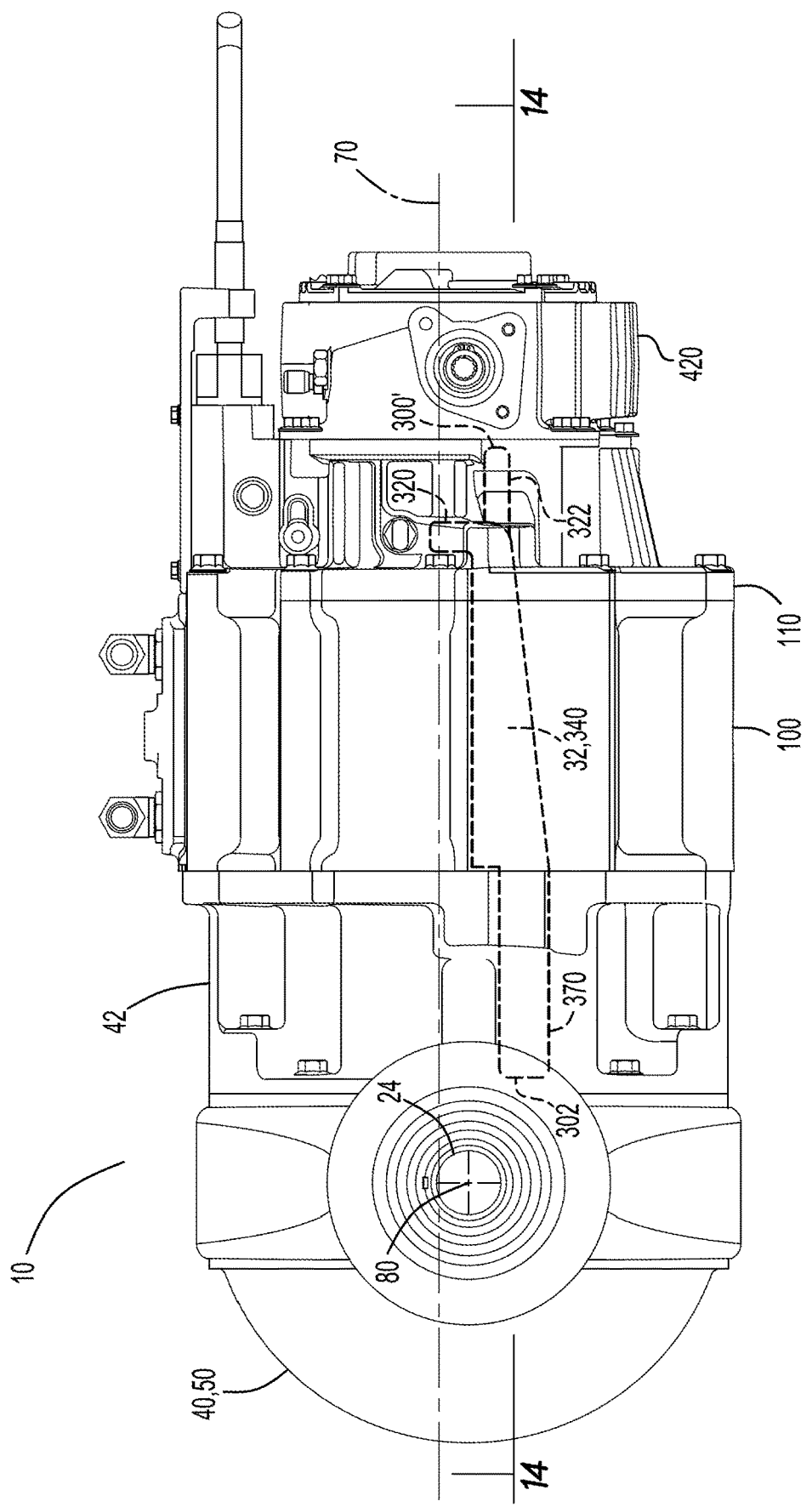
FIG. 13 is a side view of the axle assembly opposite that shown in FIG. 11.

Referring to FIGS. 13 and 14, the second lubricant passage 32 may return lubricant 56 to the axle housing 40. The flow of lubricant 56 may be represented by the arrowed lines in FIG. 14. For instance, the second lubricant passage 32 may route lubricant from the gear reduction module 34, the shift mechanism 36, the cover 110, or combinations thereof to the axle housing 40. The second lubricant passage 32 may be partially or completely disposed below the axis 70. With additional reference to FIG. 10, the second lubricant passage 32 may have at least one inlet 300, 300' and at least one outlet 302.

The inlet(s) 300 may receive lubricant 56 from the cover 110 and may be disposed further above the axis 70 than the outlet(s) 302. As such, the second lubricant passage 32 or a portion thereof may slope downward from the inlet(s) 300, 300' toward or to the outlet(s) 302.

The second lubricant passage 32 may be configured as a through hole that may extend through at least the motor housing 100. In at least one configuration, the differential carrier 42, the motor housing 100, and the cover 110 may cooperate to at least partially define the second lubricant passage 32. For instance, the second lubricant passage 32 may be at least partially defined by through holes in the differential carrier 42, the motor housing 100, and the cover 110. These through holes may be fluidly connected to each other. The text below primarily describes the second lubricant passage 32 that may be defined by these three components.

Figure 10:
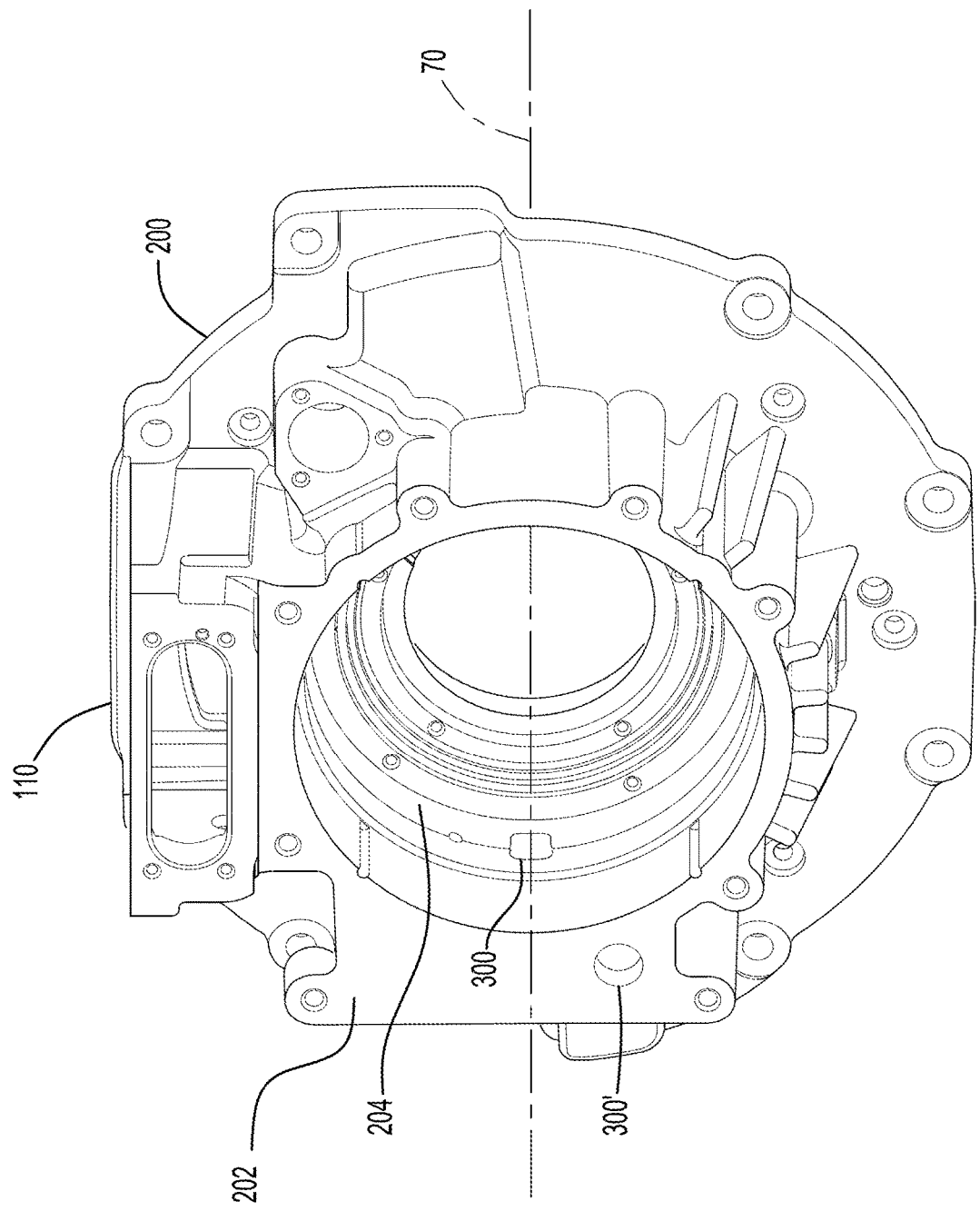

Referring to FIGS. 7-10 and 14, the cover 110 may define the inlet(s) 300, 300' and a first portion 310 of the second lubricant passage 32. The first portion 310 may also be referred to as the portion of the second lubricant passage 32 that is defined by the cover 110. As is best shown in FIG. 10, the cover 110 may include multiple inlets for the second lubricant passage 32. For clarity in reference, reference number 300 may designate a first inlet while reference number 300' may designate a second inlet. The first inlet 300, the second inlet 300', or both may be disposed further above the axis 70 than the outlet 302.

The first inlet 300 may face toward the axis 70. In at least one configuration, the first inlet 300 may face inward toward the axis 70. As such, the first inlet 300 may be disposed closer to the axis 70 than the second inlet 300'. In addition, the first inlet 300 may be axially positioned along the axis 70 closer to the motor housing 100 than the second inlet 300' as is best shown with respect to FIG. 10. The first inlet 300 may also be disposed above the second inlet 300'. The first inlet 300 is not visible in FIG. 14 due to the positioning of the section plane.

The second inlet 300' may be spaced apart from the first inlet 300. In at least one configuration, the second inlet 300' may be disposed in the second side 202 of the cover 110. As such, the second inlet 300' may face away from the motor housing 100.

Figure 8:
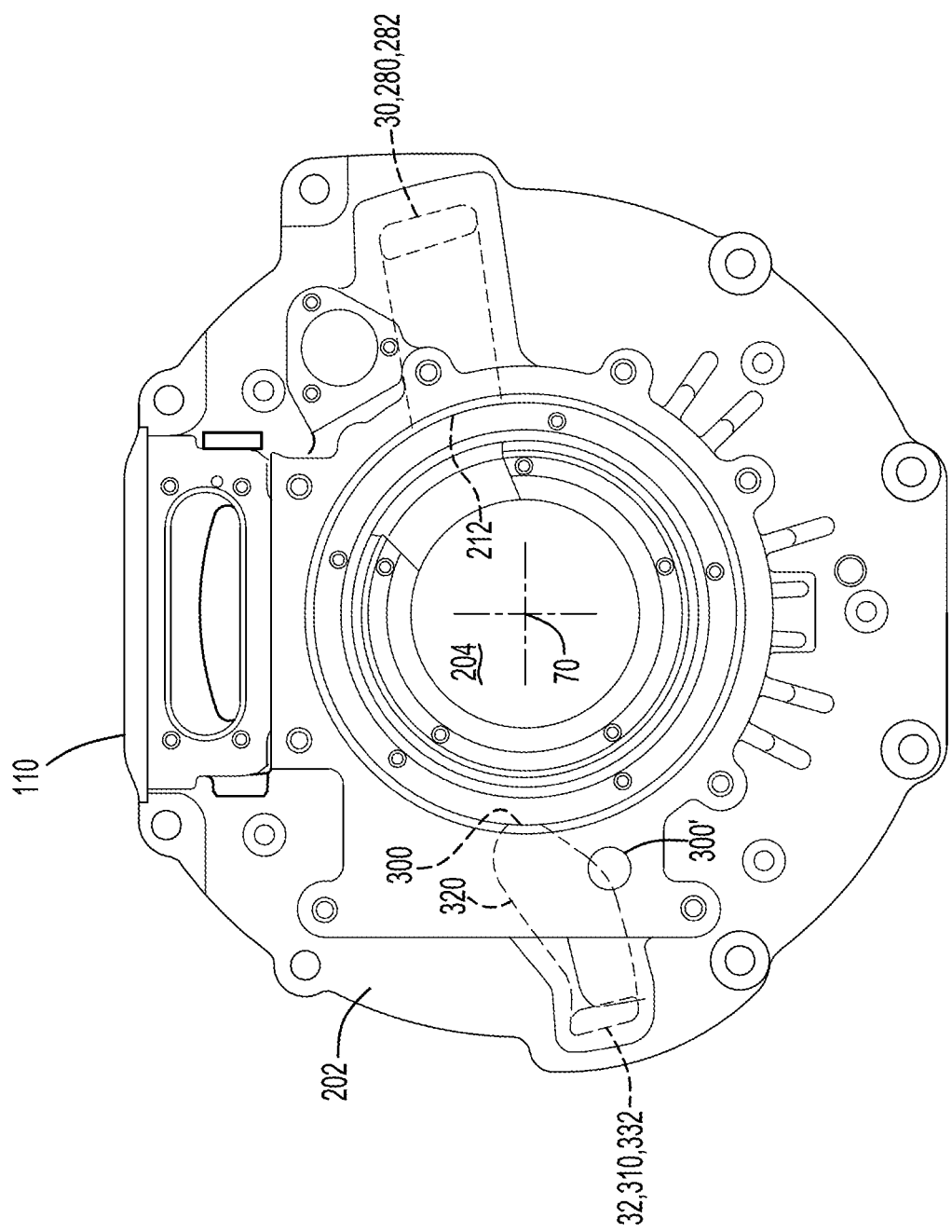
Figure 9:
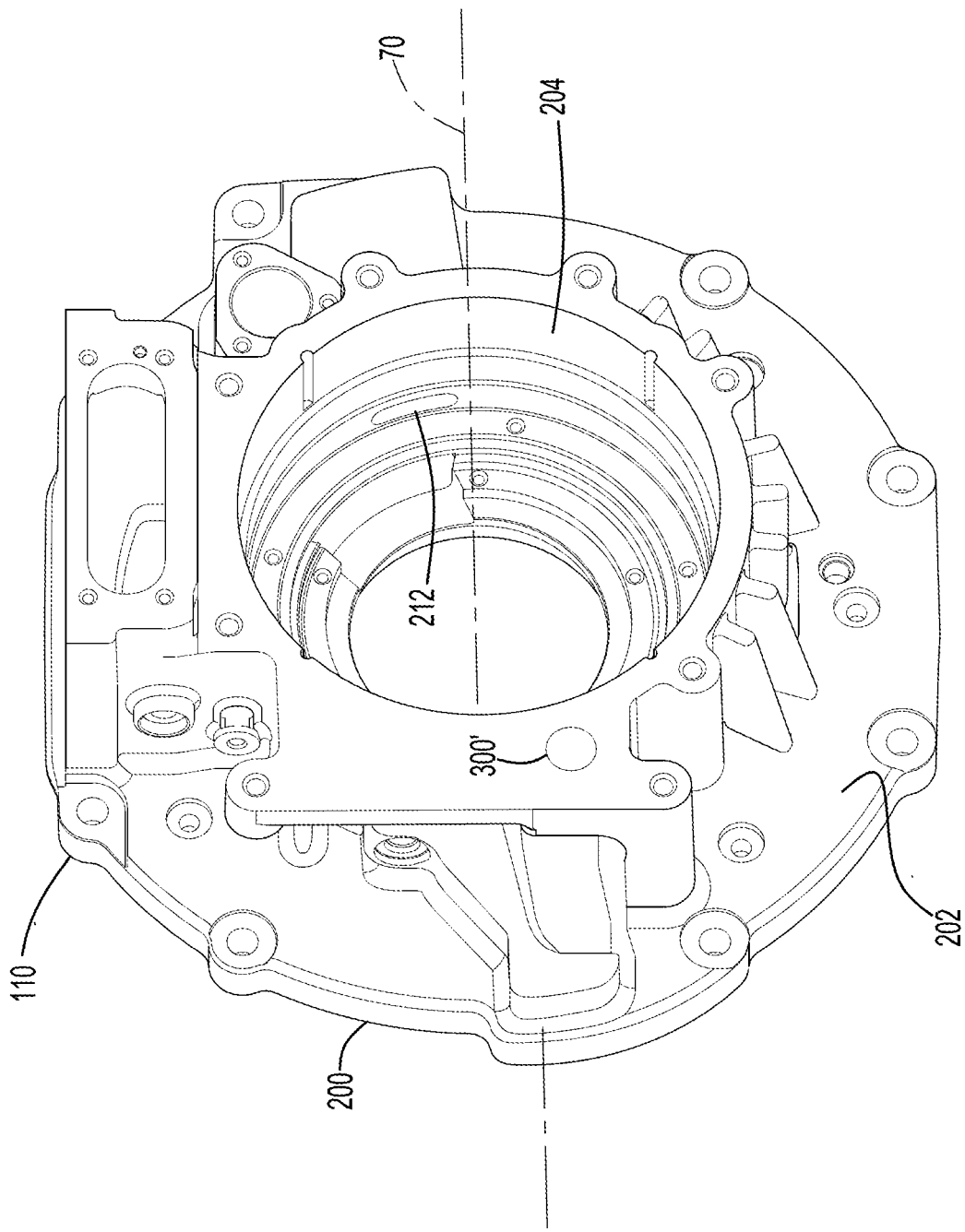
FIGS. 9 and 10 are perspective views of the cover.

Referring to FIGS. 8 and 13, the first portion 310 may have a first branch 320 and a second branch 322. The first branch 320 may extend from the first inlet 300 in a generally horizontal direction from the first inlet 300 toward the exterior side of the cover 110 or to the left from the perspective shown in FIG. 8. Referring to FIG. 13, the second branch 322 may extend in a generally axial direction from the second inlet 300' to the first branch 320. As such, the first branch 320 may be fluidly connected to the second branch 322 in at least one configuration.

Referring to FIG. 14, the first branch 320 may change direction at a bend 324 and may extend toward the motor housing 100 and to a first outlet port 332 of the first portion 310.

Referring to FIGS. 5, 6 and 14, the motor housing 100 may define a second portion 340 of the second lubricant passage 32. The second portion 340 may also be referred to as the portion of the second lubricant passage 32 that is defined by the motor housing 100.

The second portion 340 may be disposed between the exterior side 122 and the interior side 124 of the motor housing 100. In addition, the second portion 340 may be radially positioned further from the axis 70 than the stator 104 and the coolant jacket 102. For instance, the second portion 340 may be disposed between the coolant jacket 102 and the exterior side 122 of the motor housing 100. The second portion 340 may extend substantially parallel to the axis 70. The second portion 340 may have a second inlet port 342 and a second outlet port 344 and may extend from the second inlet port 342 to the second outlet port 344.

The second inlet port 342 may be disposed at the second end surface 128 of the motor housing 100 and may face toward the cover 110. The second inlet port 342 may be fluidly connected to the first outlet port 332.

The second outlet port 344 may be disposed at the first end surface 126 of the motor housing 100 and may face toward the differential carrier 42. The second outlet port 344 may be at least partially disposed below the second inlet port 342. In at least one configuration, the second outlet port 344 may have an upper end 360 and a lower end 362 as is best shown in FIG. 5.

The upper end 360 may be disposed at the top of the second outlet port 344.

The lower end 362 may be disposed opposite the upper end 360 and may be disposed proximate the bottom of the second outlet port 344. The second outlet port 344 may have an outlet port height $H_3$ that may extend from the upper end 360 to the lower end 362.

Referring to FIGS. 3, 4, and 14, the differential carrier 42 may define the outlet 302 and a third portion 370 of the second lubricant passage 32. The third portion 370 may also be referred to as the portion of the second lubricant passage 32 that is defined by the differential carrier 42.

The third portion 370 may be configured as a through hole that may extend through the differential carrier 42. As such, the third portion 370 may be disposed between an exterior side of the differential carrier 42 and an interior side of the differential carrier 42. The third portion 370 may extend from the third inlet port 372 to the outlet 302.

The third inlet port 372 may be fluidly connected to the second outlet port 344. The third inlet port 372 may be disposed at an end of the differential carrier 42 that may face toward and may engage the first end surface 126 of the motor housing 100. The third portion 370 may generally extend axially from the third inlet port 372 to the outlet 302.

Referring to FIG. 14, one or more bends may be provided between the third inlet port 372 and the outlet 302. For instance, the third portion 370 may extend from the third inlet port 372 to a first bend 380 at which the third portion 370 may extend inward toward the axis 70. The third portion 370 may then extend to a second bend 382 at which the third portion 370 may then resume extending in an axial direction toward the axle housing 40. The third portion 370 may then extend to a third bend 384 at which the third portion 370 may extend away from the axis 70 and then may extend in a generally axial direction toward the axle housing 40 and to the outlet 302. In such a configuration, the outlet 302 may be disposed outboard from a bearing support 60 and a bearing that may rotatably support the differential assembly 22. It is contemplated that a greater or lesser number of bends may be provided.

Referring to FIG. 4, the third portion 370 or a region thereof may have an inner wall 390 and an outer wall 392. The inner wall 390 may be disposed closer to the axis 70 than the outer wall 392. The inner wall 390, the outer wall 392, or both may extend along an arc. For instance, the inner wall 390, the outer wall 392, or both have a portion that may be radially disposed with respect to the axis 70.

The third inlet port 372 may also have a top wall 394 and a bottom wall 396. The top wall 394 may be disposed above the bottom wall 396 and may extend from the inner wall 390 to the outer wall 392. The bottom wall 396 may be spaced apart from the top wall 394 and may extend from the inner wall 390 to the outer wall 392. The third inlet port 372 may have a height $H_4$ that may extend from the top wall 394 to the bottom wall 396. The height $H_3$ of the second outlet port 344 may be greater than the height $H_4$ of the third inlet port 372. For instance, the upper end 360 of the second outlet port 344 may be disposed above and may be spaced apart from the top wall 394 of the third inlet port 372, the lower end 362 of the second outlet port 344 may be disposed below and may be spaced apart from the bottom wall 396 of the third inlet port 372, or both. Such a configuration may provide compatibility with different differential carriers 42 and different sized differential assemblies 22 as previously discussed.

Referring to FIGS. 12 and 14, the first lubricant passage 30 and the second lubricant passage 32 may be disposed on opposite sides of a center plane 400 that may extend vertically through the axis 70. The axis 70 may be completely disposed in the center plane 400.

The first lubricant passage 30 and the second lubricant passage 32 may allow lubricant 56 to be circulated between different portions of the axle assembly 10, such as the sump portion 54 and the gear reduction module 34. As such, the first lubricant passage 30 and the second lubricant passage 32 may allow a common lubricant to be used to lubricate components of the differential assembly 22 and the gear reduction module 34. Moreover, this configuration may allow the housing assembly 20 to be provided without separate lubricant reservoirs or separate sump portions for the axle housing 40 and the gear reduction module 34, which may allow seals that separate the lubricant reservoirs to be eliminated.

In addition, the first lubricant passage 30 and the second lubricant passage 32 may provide a flow path that is separate from the drive pinion 84 or cavity that receives the drive pinion 84. Routing lubricant through the drive pinion 84 or a cavity that receives the drive pinion 84 may make it difficult to return lubricant 56 to the sump portion 54 due to the obstruction or narrower flow path presented by the drive pinion 84 and its supporting bearings. Routing lubricant 56 via the first lubricant passage 30 and the second lubricant passage 32 may reduce the level of lubricant 56 around the drive pinion 84, which in turn may reduce drag on the drive pinion 84 and may help improve operating efficiency of the axle assembly 10.

The first lubricant passage 30 and the second lubricant passage 32 may allow lubricant 56 to be circulated inside the axle assembly 10 and without conduits or hoses that are routed outside the housing assembly 20 where they may be susceptible to damage.

The first lubricant passage 30 and the second lubricant passage 32 may facilitate heat transfer. Thermal energy or heat may be transferred between the coolant in the coolant jacket 102 and the lubricant 56 in the first lubricant passage 30, the second lubricant passage 32, or both. As an example, heat may be transferred from the coolant to the lubricant 56 when the coolant temperature exceeds the lubricant temperature or vice versa. Heat transfer from the coolant to the lubricant 56 may help heat the lubricant 56 in cold operating conditions, which may help improve lubricant flow and/or lubricating performance. Heat transfer from the lubricant 56 to the coolant may help reduce the lubricant temperature, which may help extend the life of the lubricant 56.

Gear Reduction Module

Referring to FIG. 2, the gear reduction module 34, if provided, may transmit torque from the electric motor module 26 to the differential assembly 22. As such, the gear reduction module 34 may be operatively connected to the electric motor module 26 and may be operatively connectable to the differential assembly 22. The gear reduction module 34 may be disposed outside of the differential carrier 42 and may be primarily disposed outside of the electric motor module 26 or entirely disposed outside the electric motor module 26, thereby providing a modular construction that may be mounted to the electric motor module 26 when gear reduction is desired.

The gear reduction module 34 may be provided in various configurations, such as planetary gear set configurations and non-planetary gear set configurations. In FIG. 2, an example of a gear reduction module 34 that has a planetary gear set is shown. In such a configuration, the gear reduction module 34 may include a sun gear 410, planet gears 412, a planetary ring gear 414, and a planet gear carrier 416. The gear reduction module 34 may also include a lubricant catching ring 418.

The sun gear 410 may be operatively connected to the rotor 106, such as via the rotor output flange 86. As such, the sun gear 410 may be rotatable about the axis 70 with the rotor 106 and the rotor output flange 86. The sun gear 410 may receive the drive pinion 84.

Figure 16:
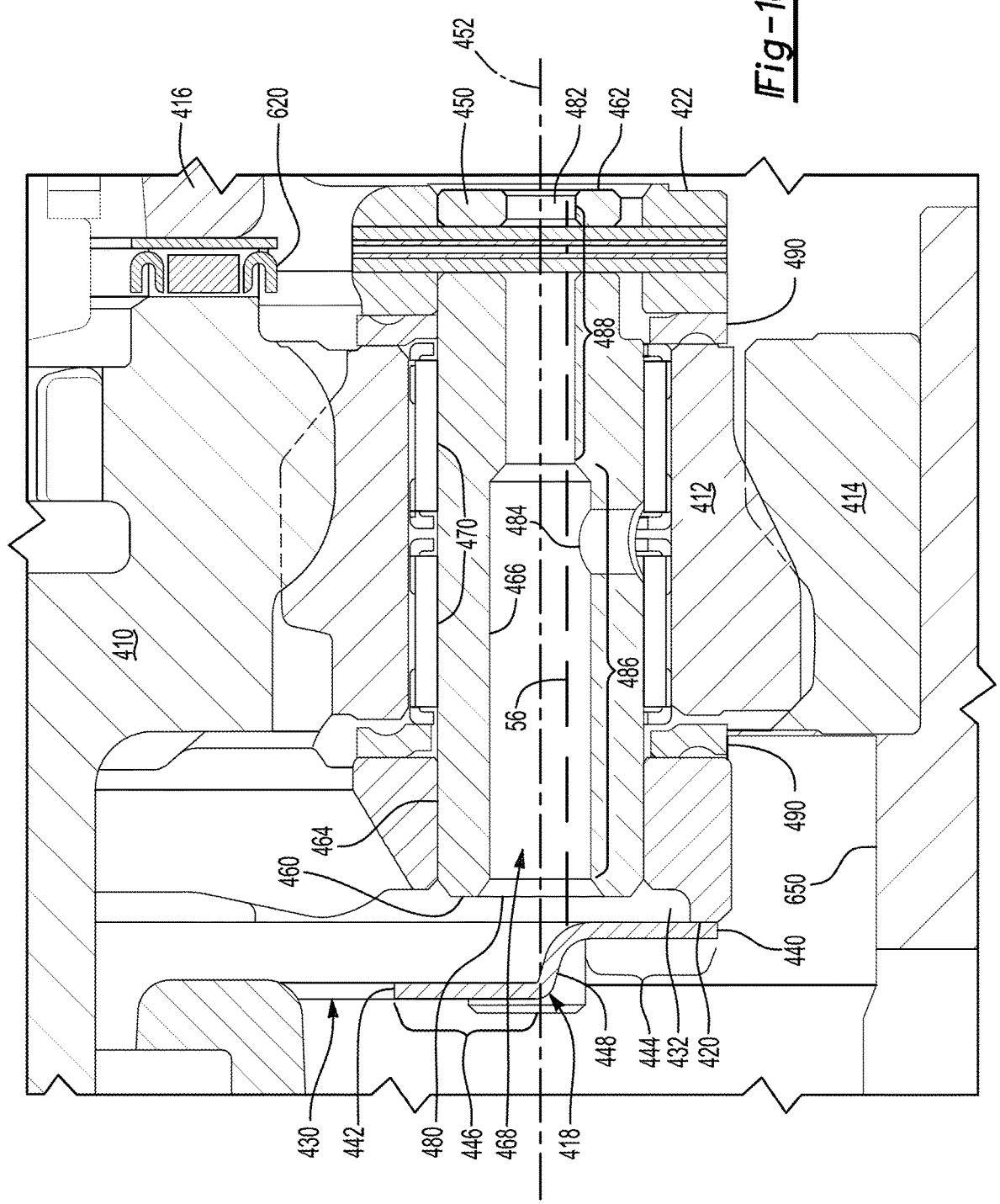
FIG. 16 is a magnified view of a portion of FIG. 15.
Figure 17:
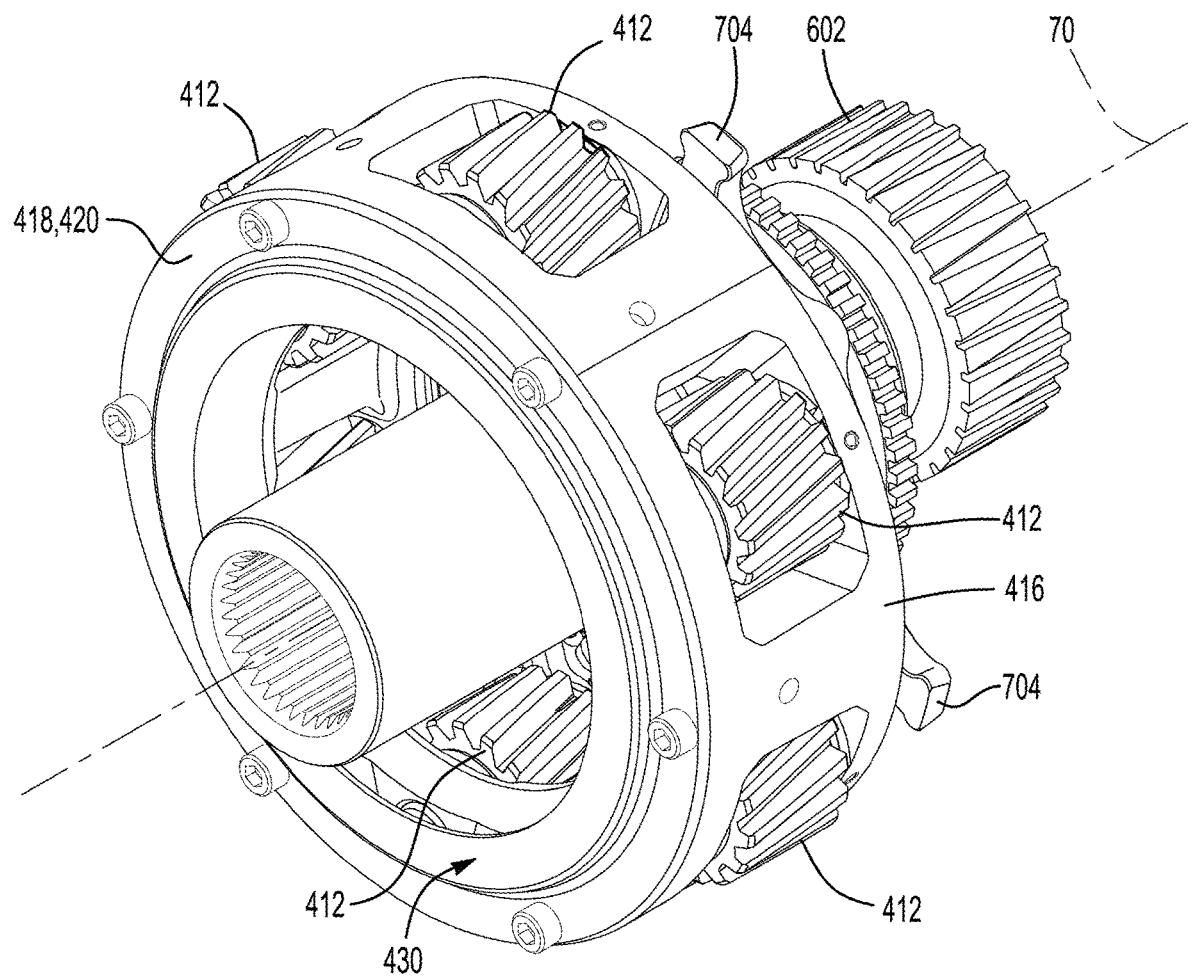
FIGS. 17 and 18 are perspective views that show a portion of a planetary gear set that may be provided with the axle assembly.
Figure 18:
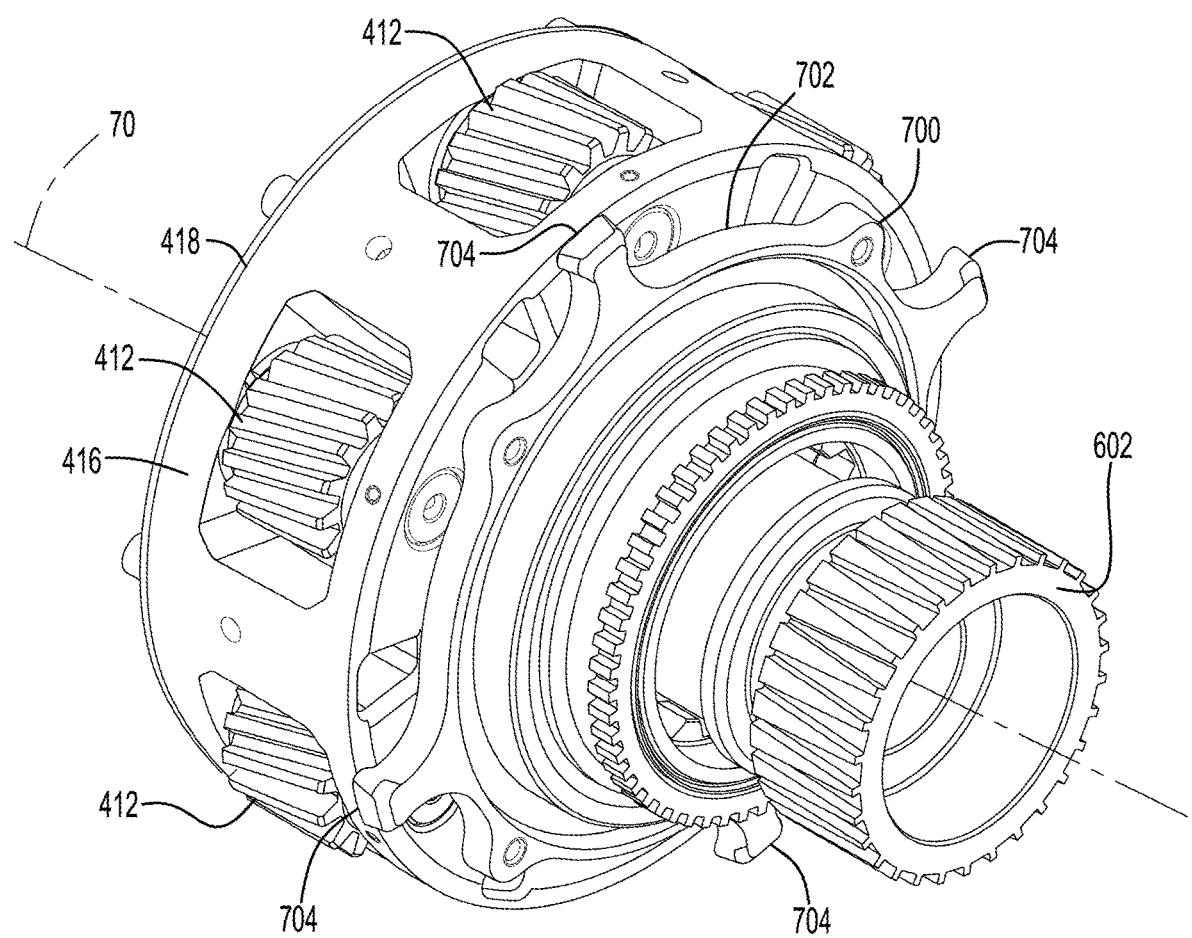

Referring to FIGS. 2, 16 and 17, the planet gears 412 may be rotatably disposed between the sun gear 410 and the planetary ring gear 414. Each planet gear 412 may have teeth that may mesh with the sun gear 410 and the planetary ring gear 414.

Referring to FIGS. 2 and 16, the planetary ring gear 414 may extend around the axis 70 and may receive the planet gears 412. In at least one configuration, the planetary ring gear 414 may be received in the cover 110 and may be fixedly disposed on the cover 110 such that the planetary ring gear 414 may not be rotatable about the axis 70.

Referring to FIGS. 2 and 16-18, the planet gear carrier 416 may be rotatable about the axis 70 and may rotatably support the planet gears 412. In at least one configuration, the planet gear carrier 416 may have a first side 420 and a second side 422, which are best shown with reference to FIGS. 16-18. The first side 420 may face toward the cover 110, or to the left from the perspective shown in FIG. 2. The second side 422 may be disposed opposite the first side 420, or to the right from the perspective shown in FIG. 2. As such, the second side 422 may face away from the cover 110.

Figure 15:
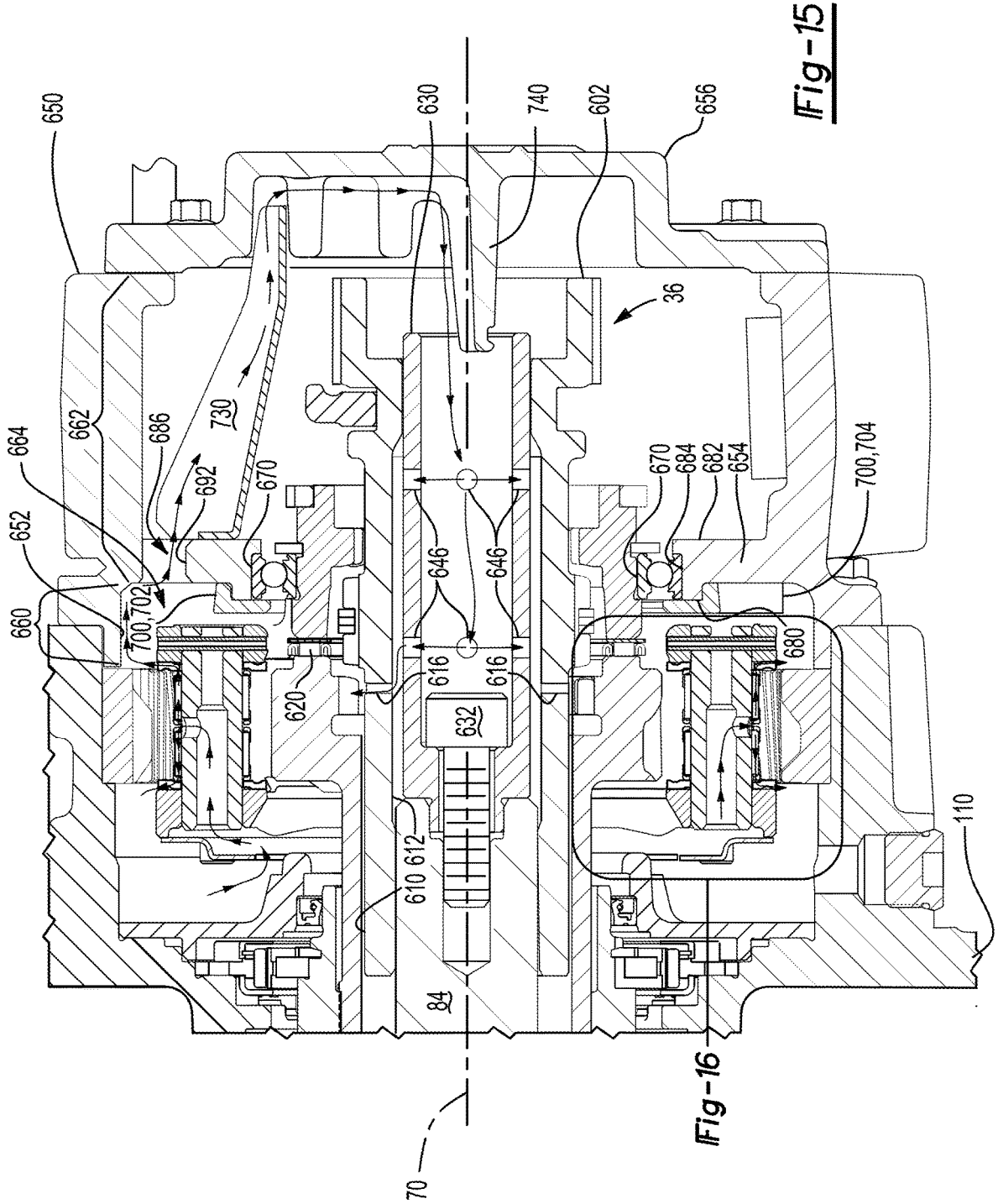
FIG. 15 is a magnified view of a portion of FIG. 2.

Referring to FIGS. 15-17, the lubricant catching ring 418 may be mounted to the planet gear carrier 416. For instance, the lubricant catching ring 418 may be mounted to the first side 420 of the planet gear carrier 416 with one or more fasteners such as bolts. As such, the lubricant catching ring 418 may not rotate with respect to the planet gear carrier 416 and may be rotatable about the axis 70 with the planet gear carrier 416. The lubricant catching ring 418 may extend continuously around the axis 70 and may define a lubricant catching ring hole 430 through which various components of the axle assembly 10, such as the drive pinion 84 and the sun gear 410, may extend. In addition, lubricant 56 that exits the first lubricant passage 30 may pass through the lubricant catching ring hole 430 to help lubricate the planetary gear set as will be discussed in more detail below. The flow of lubricant 56 may be represented by the arrowed lines in FIG. 15. As is best shown in FIG. 16, the lubricant catching ring 418 may cooperate with the planet gear carrier 416 to define a chamber 432 that captures lubricant 56 that passes through or enters the lubricant catching ring hole 430.

The lubricant catching ring 418 may have any suitable configuration. In at least one configuration, the lubricant catching ring 418 may have a first end 440, a second end 442, a first portion 444, a second portion 446, and an intermediate portion 448.

The first end 440 may face away from the axis 70. The first end 440 may be an outside circumference or outside circumferential surface of the lubricant catching ring 418.

The second end 442 may be disposed opposite the first end 440. As such, the second end 442 may face toward the axis 70. The second end 442 may at least partially define the lubricant catching ring hole 430.

The first portion 444 may extend from the first end 440 toward the axis 70. For instance, the first portion 444 may extend from the first end 440 to the intermediate portion 448. A side of the first portion 444 that faces toward the planet gear carrier 416 may be mounted to and may contact or engage the first side of the planet gear carrier 416. The first portion 444 may be partially spaced apart from the planet gear carrier 416 such that the first portion 444 and the planet gear carrier 416 may cooperate to at least partially define the chamber 432 that may receive and hold lubricant 56.

The second portion 446 may extend from the second end 442 away from the axis 70. The second portion 446 may be offset from the first portion 444. For instance, the second portion 446 may be spaced apart from the planetary gear set and may be axially positioned further from the planet gear carrier 416 than the first portion 444. The first portion 444 and the second portion 446 may be disposed substantially parallel to each other in one or more configurations. Alternatively, the second portion 446 may be disposed at an angle with respect to the first portion 444. It is also contemplated that the second portion 436 may be omitted.

The intermediate portion 448 may extend from the first portion 444 to the second portion 446. For instance, the intermediate portion 448 may extend from an end of the first portion 444 to an end of the second portion 446 and may be spaced apart from the planetary gear set. In the configuration shown, the intermediate portion 448 extends at an oblique angle from the first portion 444 and may extend further from the planet gear carrier 416 in a direction extending toward the axis 70. The intermediate portion 448 may be positioned at a distance from the axis 70 that may be generally aligned with a planet pin 450 that may rotatably support a planet gear 412. It is also contemplated that the intermediate portion 448 may be omitted.

Referring to FIG. 16, each planet gear 412 may be rotatable with respect to a planet pin 450. A planet pin 450 may be fixed to the planet gear carrier 416 such that the planet pin 450 may not rotate with respect to the planet gear carrier 416. For instance, a planet pin 450 may be received in one or more holes of the planet gear carrier 416 and may extend between the first side 420 and the second side 422 of the planet gear carrier 416. In at least one configuration, each planet pin 450 may be generally cylindrical and may extend along a planet pin axis 452. Each planet pin 450 may be spaced apart from the lubricant catching ring 418. In at least one configuration, a planet pin 450 may include a first end surface 460, a second end surface 462, an outer side 464, an inner side 466, and an axial bore 468.

The first end surface 460 may face toward the electric motor module 26 and the lubricant catching ring 418, or to the left from the perspective shown.

The second end surface 462 may be disposed opposite the first end surface 460. The second end surface 462 may face away from the electric motor module 26.

The outer side 464 may extend from the first end surface 460 to the second end surface 462. The outer side 464 may face away from the planet pin axis 452 and the axial bore 468. Optionally, one or more bearing assemblies 470 that rotatably support a planet gear 412 may be disposed on and may extend around the outer side 464. A bearing assembly 470 may be received inside a hole in the planet gear 412 and may extend from the outer side 464 to the planet gear 412.

The inner side 466 may be disposed opposite the outer side 464. As such, the inner side 466 may face toward the planet pin axis 452. The inner side 466 may at least partially define the axial bore 468.

The axial bore 468 may receive lubricant 56 and help route lubricant 56 to the planet gears 412 and to the bearing assemblies 470. The axial bore 468 may extend along and may be centered about the planet pin axis 452 and may extend partially or completely through the planet pin 450. In the configuration shown, the axial bore 468 is configured as a through hole that extends completely through the planet pin 450 from the first end surface 460 to the second end surface 462. In such a configuration, the axial bore 468 may have a first opening 480, a second opening 482, and a connecting passage 484. Optionally, the axial bore 468 may be subdivided into a first axial bore portion 486 and a second axial bore portion 488.

The first opening 480 may be disposed in the first end surface 460 and may face toward the lubricant catching ring 418. The first opening 480 may receive lubricant 56 that is captured by the lubricant catching ring 418.

The second opening 482, if provided, may be disposed opposite the first opening 480. As such, the second opening 482 may be disposed opposite the first opening 480.

One or more connecting passages 484 may extend from the inner side 466 and the axial bore 468 to the outer side 464 of the planet pin 450. In at least one configuration, the connecting passage 484 may extend from a first axial bore portion 486 to the outer side 464 of the planet pin 450. A connecting passage 484 may be oriented such that the connecting passage 484 or a portion thereof extends away from the axis 70. For instance, a connecting passage 484 may be positioned such that the connecting passage 484 is disposed further from the axis 70 than the planet pin axis 452 is disposed from the axis 70. Such positioning may help direct lubricant 56 into a connecting passage 484 during operation of the planetary gear set. For instance, centrifugal force that occurs when the planet gear carrier 416 and the planet pins 450 rotate about the axis 70 may urge lubricant 56 in the axial bore 468 to move away from the axis 70. Thus, positioning a connecting passage 484 further outward from or at a greater distance from the axis 70 than the planet pin axis 452 is positioned from the axis 70 may facilitate the flow of lubricant 56 into the connecting passage 484. It is also contemplated that a connecting passage 484 or a portion thereof may not be disposed further from the axis 70 than the planet pin axis 452 is positioned from the axis 70.

The first axial bore portion 486 may extend from the first end surface 460 toward the second end surface 462. For instance, the first axial bore portion 486 may extend from the first opening 480 toward the second opening 482.

The second axial bore portion 488 may extend from the second end surface 462 toward the first end surface 460. For instance, the second axial bore portion 488 may extend from the second end surface 462 and the second opening 482 to the first axial bore portion 486. The second axial bore portion 488 may serve one or more purposes. For example, the second axial bore portion 488 may act as a flow restrictor with respect to the first axial bore portion 486 to help route lubricant 56 through the connecting passage 484. This may be accomplished by providing the first axial bore portion 486 with a larger diameter than the second axial bore portion 488. As another example, the second axial bore portion 488 may be an overflow passage that may allow excess lubricant 56 to exit the axial bore 468 via the second opening 482. Permitting lubricant 56 to overflow through the second axial bore portion 488 may encourage or maintain lubricant flow into or through the axial bore 468 and may help supply lubricant 56 to the planet gear 412 and its associated bearing assemblies 470 if provided.

Figure 19:
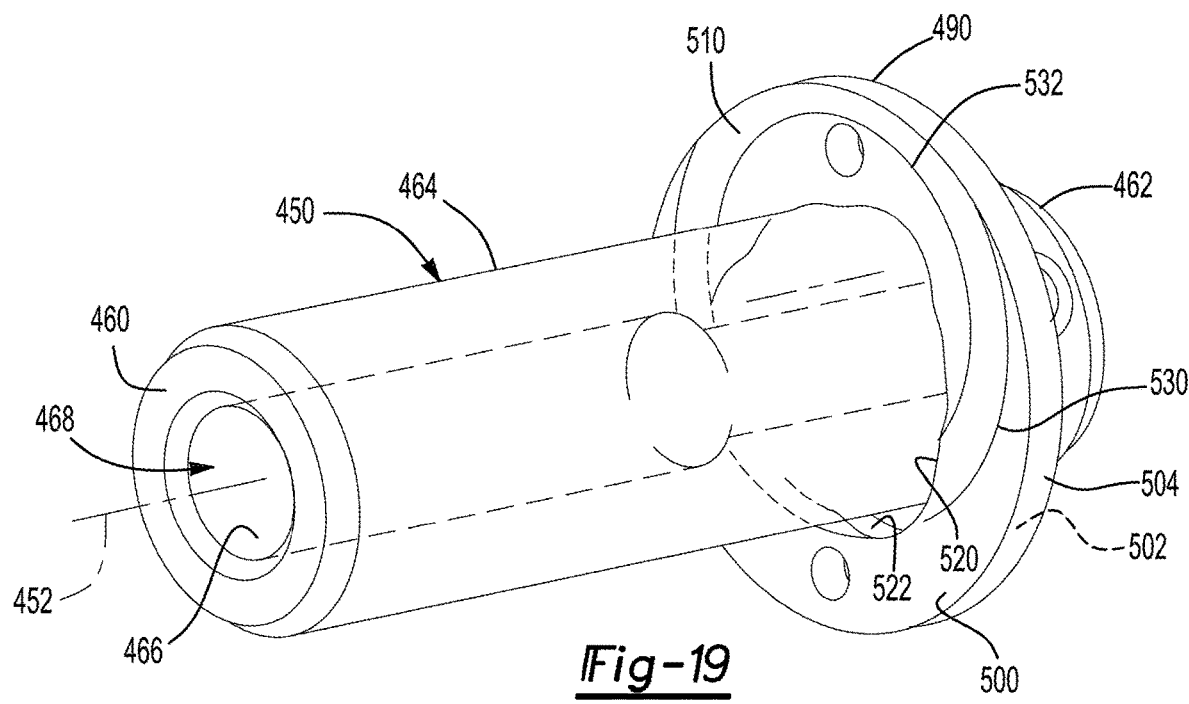
FIG. 19 is a perspective view of a planet pin and a washer that may be provided with the planetary gear set.
Figure 20:
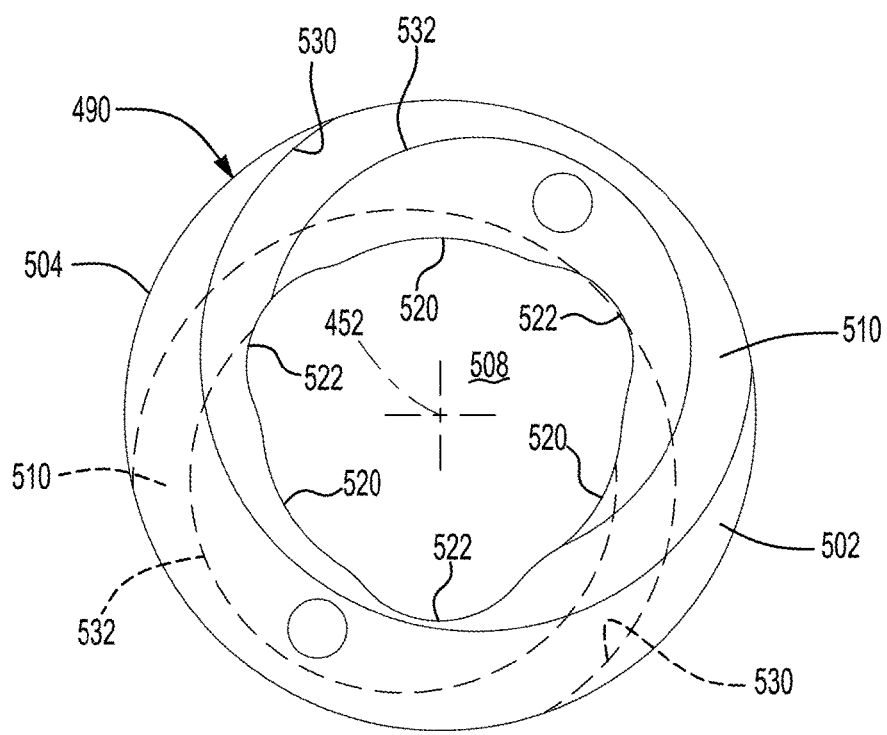
FIG. 20 is a side view of the washer of FIG. 19.

Referring to FIGS. 16, 19 and 20, a washer 490 may be positioned between a planet gear 412 in the planet gear carrier 416. For instance, a washer 490 may be axially positioned between an end of a planet gear 412 and the planet gear carrier 416. In at least one configuration and as is best shown in FIGS. 19 and 20, the washer 490 may include a first washer side 500, a second washer side 502, an outside washer surface 504, an inside washer surface 506, and a washer hole 508. Optionally, the washer 490 may include one or more elliptical grooves 510.

The first washer side 500 may be generally planar. The first washer side 500 may face toward the planet gear 412.

The second washer side 502 may be disposed opposite the first washer side 500. As such the second washer side 502 may face away from the planet gear 412. The second washer side 502 may also be generally planar. It is contemplated that the first washer side 500 and the second washer side 502 may be reversed from the designations shown.

The outside washer surface 504 may extend from the first washer side 500 to the second washer side 502. The outside washer surface 504 may face away from the washer hole 508 and may be an outside circumference surface of the washer 490.

The inside washer surface 506 may be disposed opposite the outside washer surface 504. The inside washer surface 506 may at least partially define the washer hole 508. The inside washer surface 506 may have a circular or a noncircular configuration. In the configuration shown, the inside washer surface 506 is shown with a noncircular configuration that may include a set of arcuate surfaces 520 that may be configured to contact the outer side 464 of the planet pin 450 and a set of connecting surfaces 522 that may face toward but may be spaced apart from the outer side 464 of the planet pin 450 to permit lubricant 56 to flow through the washer hole 508. Each member of the set of connecting surfaces 522 may extend between an adjacent pair of members of the set of arcuate surfaces 520. Moreover, a portion of each member of the set of connecting surfaces 522 may extend further from the planet pin axis 452 than the members of the set of arcuate surfaces 520.

The washer hole 508 may be a through hole that may extend through the washer 490. The washer hole 508 may receive a planet pin 450.

Referring to FIG. 20, an elliptical groove 510 may be provided in the first washer side 500, the second washer side 502, or both. The elliptical groove 510 may help route lubricant 56 away from the planet pin 450 and thus may help facilitate the flow of lubricant 56 from the inside the planet gear 412 and from the bearing assembly 470. As such, the elliptical groove 510 may improve lubricant flow between the washer 490 and a planet gear 412, between the washer 490 and the planet gear carrier 416, or both. An elliptical groove 510 may be at least partially defined by a first elliptical edge 530 and a second elliptical edge 532.

The first elliptical edge 530 may extend along an ellipse or an elliptical path. The first elliptical edge 530 may intersect the outside washer surface 504 at two different points. The first elliptical edge 530 may be disposed tangential to the washer hole 508.

The second elliptical edge 532 may be spaced apart from the first elliptical edge 530. The second elliptical edge 532 may intersect the washer hole 508 at two different points. In addition the second elliptical edge 532 may be spaced apart from and may not intersect the outside washer surface 504. In at least one configuration, the second elliptical edge 532 may be approximately centered inside of the first elliptical edge 530 or with respect to the first elliptical edge 530.

In configurations having an elliptical groove 510 provided on the first washer side 500 and the second washer side 502, the elliptical grooves 510 may have the same or different positioning. In the configuration shown in FIG. 20, the elliptical groove 510 in the first washer side 500 is shown with solid lines while the elliptical groove 510 in the second washer side 502 is shown with hidden lines. In the illustrated configuration, the elliptical grooves 510 extend in opposite directions from the washer hole 508. Such a configuration may help ensure that at least a portion of one elliptical groove 510 extends away from the axis 70 when installed so that centrifugal force may help urge lubricant 56 to flow through an elliptical groove 510 from the washer hole 508 toward the outside washer surface 504, such as when the planetary gear set is rotating about the axis 70. Providing elliptical grooves in different positions in the first washer side 500 and the second washer side 502 may allow the planetary gear set to be assembled without needing to maintain a particular rotational orientation of a washer 490 yet may help ensure that at least one elliptical groove 510 or a portion thereof will be positioned to take advantage of centrifugal forces to help route lubricant 56 through an elliptical groove 510 and away from the planet pin 450.

Shift Mechanism

Referring to FIG. 2, the shift mechanism 36 may cooperate with the gear reduction module 34 to provide a desired gear reduction ratio to change the torque provided from the electric motor module 26 to the differential assembly 22, and hence to the axle shafts 24 of the axle assembly 10. For example, the shift mechanism 36 may operatively connect the sun gear 410 to the drive pinion 84 to provide a first drive gear ratio and may operatively connect the planet gear carrier 416 to the drive pinion 84 to provide a second drive gear ratio that may differ from the first drive gear ratio.

The shift mechanism 36 may have any suitable configuration. For instance, the shift mechanism 36 may include an actuator 600, which is best shown in FIG. 1. The shift mechanism 36 may also include a shift collar 602, which is best shown in FIGS. 15 and 25.

Referring to FIG. 1, the actuator 600 may be configured to move the shift collar 602 along the axis 70 to selectively couple the planetary gear set to the drive pinion 84 or decouple the planetary gear set from the drive pinion 84. The actuator 600 may be of any suitable type.

Referring to FIGS. 15 and 25, the shift collar 602 may be movable along the axis 70 to selectively couple the planetary gear set to the drive pinion 84. For instance, the shift collar 602 may be disposed on the drive pinion 84 such that the shift collar 602 may be rotatable about the axis 70 with the drive pinion 84 and may be movable in an axial direction or along the axis 70 with respect to the drive pinion 84. The shift collar 602 may include teeth that may extend away from the axis 70 that may be selectively engageable with corresponding teeth of the sun gear 410 or the planet gear carrier 416 of the planetary gear set to facilitate the transmission of torque between the electric motor module 26 and the differential assembly 22 at a desired torque ratio. The shift collar 602 may be provided in various configurations. In at least one configuration, the shift collar 602 may have an outer shift collar side 610, an inner shift collar side 612, a shift collar hole 614, and one or more shift collar lubricant holes 616.

The outer shift collar side 610 may face away from the axis 70.

The inner shift collar side 612 may be disposed opposite the outer shift collar side 610. As such, the inner shift collar side 612 may face toward the axis 70. The inner shift collar side 612 may at least partially define the shift collar hole 614.

The shift collar hole 614 may be a through hole that may extend through the shift collar 602. The shift collar hole 614 may receive a shaft portion of the drive pinion 84. A set of splines may extend into the shift collar hole 614 to rotatably couple the shift collar 602 to the drive pinion 84.

One or more shift collar lubricant holes 616 may extend through the shift collar 602. A shift collar lubricant hole 616 may be a through hole that may extend from the inner shift collar side 612 to the outer shift collar side 610. One or more shift collar lubricant holes 616 may be disposed substantially perpendicular to the axis 70. A shift collar lubricant hole 616 may allow lubricant 56 to exit the shift collar hole 614 to help lubricate various components, such as a thrust bearing 620 that may extend between the sun gear 410 and the planet gear carrier 416 as is best shown in FIG. 16. In addition, lubricant 56 that exits the shift collar lubricant hole 616 may flow along the shift collar 602 to help lubricate the teeth of the shift collar 602.

Referring to FIGS. 15 and 25, a support tube 630 may be received in the shift collar lubricant hole 616. The support tube 630 may help support the shift collar 602 on the drive pinion 84 and may inhibit deflection of the shift collar 602 with respect to the axis 70. The support tube 630 may be fastened to the drive pinion 84. For instance, the support tube 630 may be attached to an end of the drive pinion 84 with a fastener 632, such as a bolt. In at least one configuration, the support tube 630 may have an outer support tube side 640, an inner support tube side 642, a support tube hole 644, and a support tube lubricant hole 646.

The outer support tube side 640 may face away from the axis 70. The outer support tube side 640 may engage or contact the inner shift collar side 612 of the shift collar 602.

The inner support tube side 642 may be disposed opposite the outer support tube side 640. The inner support tube side 642 may face toward the axis 70. The inner support tube side 642 may at least partially define the support tube hole 644.

The support tube hole 644 may extend from an end of the support tube 630 toward the drive pinion 84 or to the drive pinion 84. In at least one configuration, the support tube hole 644 may receive the fastener 632. The support tube 630 may receive a portion of a lubricant chute 730 that extends from a shift mechanism housing cover 656 as will be discussed in more detail below.

One or more support tube lubricant holes 646 may extend through the support tube 630. A support tube lubricant hole 646 may extend from the inner support tube side 642 to the outer support tube side 640. One or more support tube lubricant holes 646 may be disposed substantially perpendicular to the axis 70. Lubricant that enters the support tube hole 644 may pass through a support tube lubricant hole 646 such that the lubricant 56 may be positioned in a cavity located between the outer support tube side 640 of the support tube 630 and the inner shift collar side 612 of the shift collar 602. Lubricant may then exit the cavity via a shift collar lubricant hole 646 as previously described.

Referring to FIGS. 2 and 15, the shift mechanism 36 may be received in a shift mechanism housing 650. The shift mechanism housing 650 may be disposed on the cover 110 and may be mounted to a side of the cover 110 that may be disposed opposite the differential carrier 42. Optionally, the shift mechanism housing 650 may facilitate mounting of the actuator 600. In at least one configuration, the shift mechanism housing 650 may include an inner housing side 652 and a wall 654. A shift mechanism housing cover 656 may be disposed proximate an end of the shift mechanism housing 650 that may face away from the cover 110.

Figure 21:
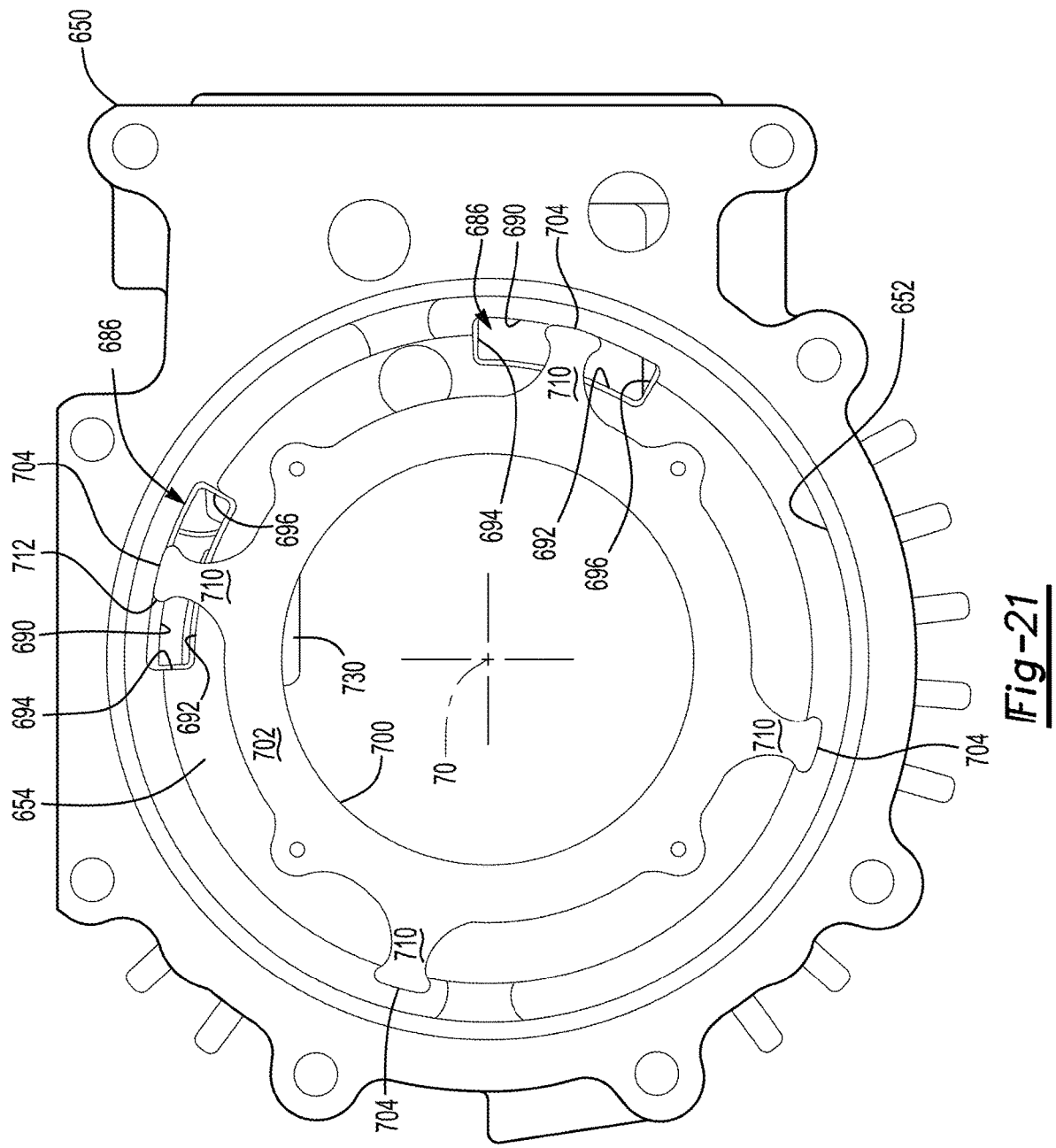
FIG. 21 is a side view of a shift mechanism housing and a deflector that may be provided with the axle assembly.

Referring to FIGS. 15 and 21, the inner housing side 652 may face toward the axis 70 and may extend around the axis 70. The inner housing side 652 may include a first portion 660 and a second portion 662.

Referring to FIG. 15, the first portion 660 may extend from an end of the shift mechanism housing 650 toward or to the second portion 662. The first portion 660 may extend around a portion of the planetary gear set and may be axially positioned between the cover 110 and the wall 654. The first portion 660 may have a larger diameter than the second portion 662 and may cooperate with the wall 654 to help define an annular cavity 664 that may extend around the axis 70.

The second portion 662 may generally extend between the wall 654 and the shift mechanism housing cover 656. The second portion 662 may have a smaller diameter than the first portion 660.

Referring to FIGS. 15 and 21, the wall 654 may extend from the inner housing side toward the axis 70. For instance, the wall 654 or a portion thereof may be disposed substantially perpendicular to the axis 70. The wall 654 may be axially positioned between the planetary gear set and the shift mechanism housing cover 656. The wall 654 may help support the planet gear carrier 416. For instance, the wall 654 may extend around a bearing assembly 670 that may rotatably support the planet gear carrier 416. In at least one configuration, the wall 654 may include a first wall side 680, a second wall side 682, and an inner wall side 684. In addition, the wall 654 may define one or more lubricant openings 686.

The first wall side 680 may extend from the inner housing side 652 toward the axis 70. The first wall side 680 may face toward the planetary gear set, or to the left from the perspective shown in FIG. 15.

The second wall side 682 may be disposed opposite the first wall side 680. The second wall side 682 may also extend from the inner housing side 652 toward the axis 70. The second wall side 682 may face away from the planetary gear set or may face to the right from the perspective shown in FIG. 15.

The inner wall side 684 may extend between the first wall side 680 and the second wall side 682. The inner wall side 684 may receive and may engage the bearing assembly 670.

One or more lubricant openings 686 may be provided in the wall 654. In the configuration shown in FIG. 21, two lubricant openings 686 are shown; however, it is contemplated that a greater or lesser number of lubricant openings 686 may be provided. A lubricant opening 686 may be configured as a through hole that may extend from the first wall side 680 to the second wall side 682. A lubricant opening 686 may be disposed proximate the inner housing side 652. In at least one configuration, a lubricant opening 686 may be partially defined by the inner housing side 652. As is best shown in FIG. 21, a lubricant opening 686 may extend along a curve or an arc. For instance, a lubricant opening 686 may have an outer lubricant opening side 690 and an inner lubricant opening side 692 that may extend along a curve or an arc. The outer lubricant opening side 690, the inner lubricant opening side 692, or both may be radially disposed with respect to the axis 70. A first lubricant opening side 694 and a second lubricant opening side 696 may be disposed at opposite ends of the lubricant opening 686. The first lubricant opening side 694 may extend from a first end of the outer lubricant opening side 690 to a first end of the inner lubricant opening side 692. The second lubricant opening side 696 may extend from a second end of the outer lubricant opening side 690 to a second end of the inner lubricant opening side 692.

Figure 23:
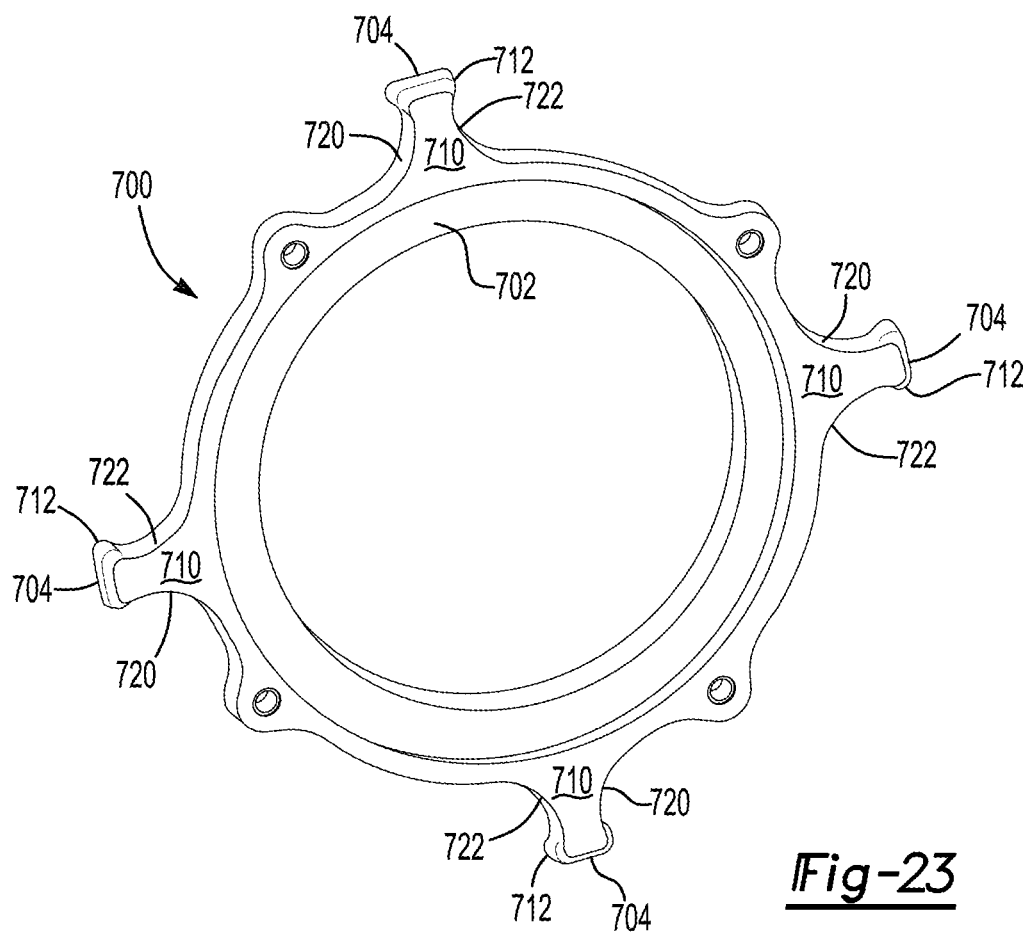
FIG. 23 is a perspective view of an example of the deflector.

Referring to FIGS. 15, 21 and 23, a deflector 700 may be mounted to the shift mechanism housing 650 proximate the lubricant opening 686. The deflector 700 may be axially positioned between the planetary gear set and the wall 654. The deflector 700 may direct lubricant 56 through one or more lubricant openings 686. The deflector 700 may be mounted to the first wall side 680 of the wall 654 and may be spaced apart from the inner housing side 652 of the shift mechanism housing 650. In at least one configuration, the deflector 700 may include a ring portion 702 and one or more deflector portions 704.

The ring portion 702, if provided, may extend continuously around the axis 70. The ring portion 702 may include one or more fastener holes that may receive fasteners that may mount the deflector 700 to the wall 654.

One or more deflector portions 704 may extend from the ring portion 702. In FIGS. 21 and 23, four deflector portions 704 are shown; however, it is contemplated that a greater or lesser number of deflector portions 704 may be provided. A deflector portion 704 may be disposed along a radial line with respect to the axis 70. In addition, a deflector portion 704 may be positioned at or near the center of a lubricant opening 686. For instance, a deflector portion 704 may be generally positioned halfway between the first lubricant opening side 694 and the second lubricant opening side 696 as is best shown in FIG. 21. In at least one configuration, a deflector portion 704 may be spaced apart from the first portion 660 of the inner housing side 652. In at least one configuration, a deflector portion 704 may include a stem 710 and an enlarged head 712.

The stem 710 may extend from the ring portion 702 in a direction that extends away from the axis 70. In at least one configuration, the stem 710 may be narrower than the enlarged head 712.

The enlarged head 712 may be disposed at the end of the stem 710. In at least one configuration, the stem 710 and the enlarged head 712 may cooperate to define a first deflection surface 720 and a second deflection surface 722. The first deflection surface 720 and the second deflection surface 722 may be disposed opposite each other. In at least one configuration, the first deflection surface 720 and the second deflection surface 722 may have mirror symmetry with respect to each other. The first deflection surface 720, the second deflection surface 722, or both may be tapered such that the first deflection surface 720 and/or the second deflection surface 722 become closer together in an axial direction that may extend along the axis 70 toward the lubricant opening 686. A tapered configuration may help direct lubricant 56 toward a lubricant opening 686.

Rotation of the planetary gear set may cause lubricant 56 in the annular cavity 664 of the shift mechanism housing 650 to move along the inner housing side 652 about the axis 70. As such, rotation of the planetary gear set may cause lubricant 56 to move in a circumferential direction about the axis 70. The deflector 700 may redirect the lubricant 56 from moving in a circumferential direction to moving in an axial direction and through the lubricant opening 686. Providing a tapered configuration on the first deflection surface 720 and the second deflection surface 722 may help direct lubricant 56 in the annular cavity 664 toward the lubricant opening 686 as the planetary gear set rotates in either direction about the axis 70.

Figure 22:
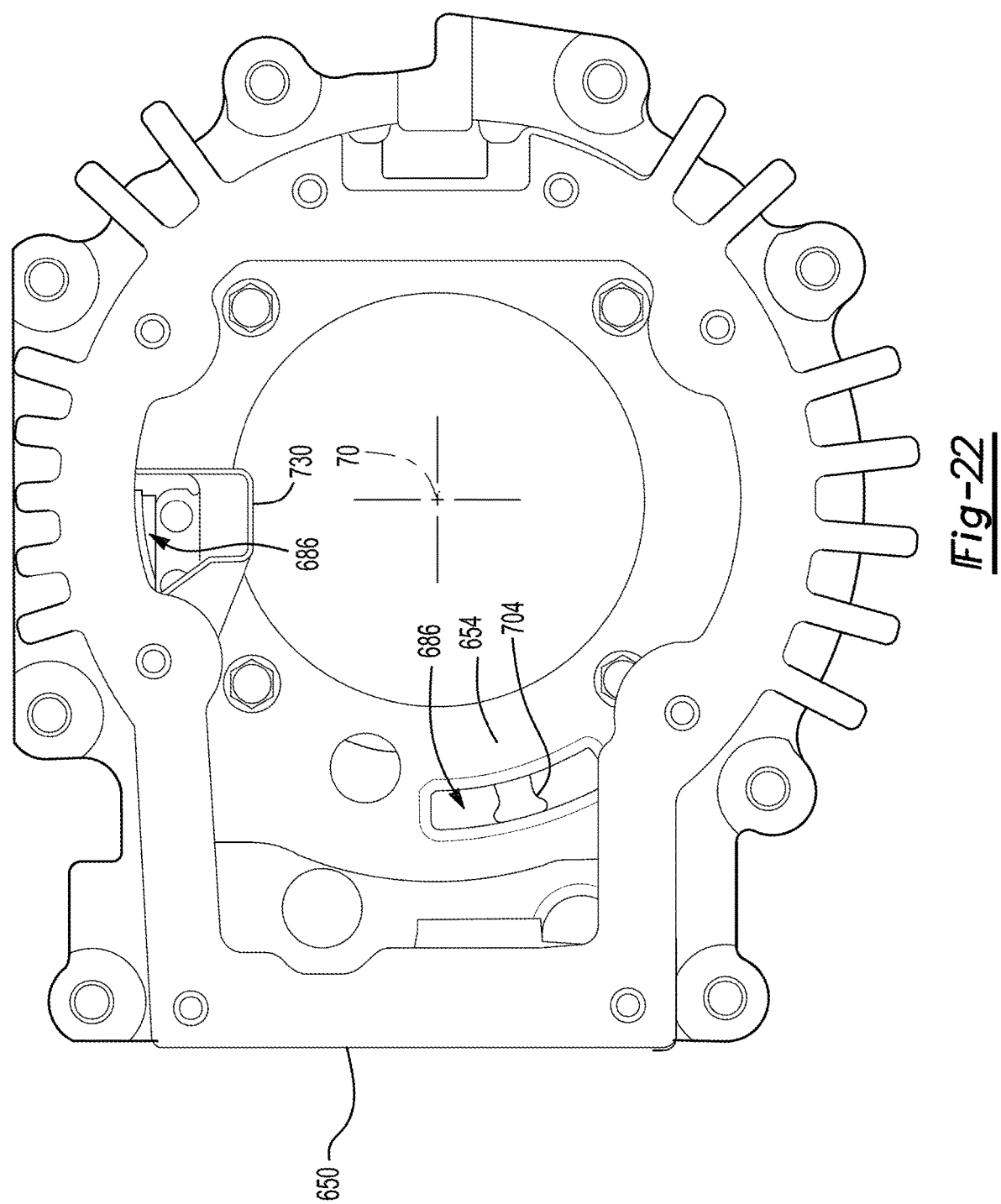
FIG. 22 is a opposite side view of FIG. 20 showing a lubricant chute.
Figure 24:
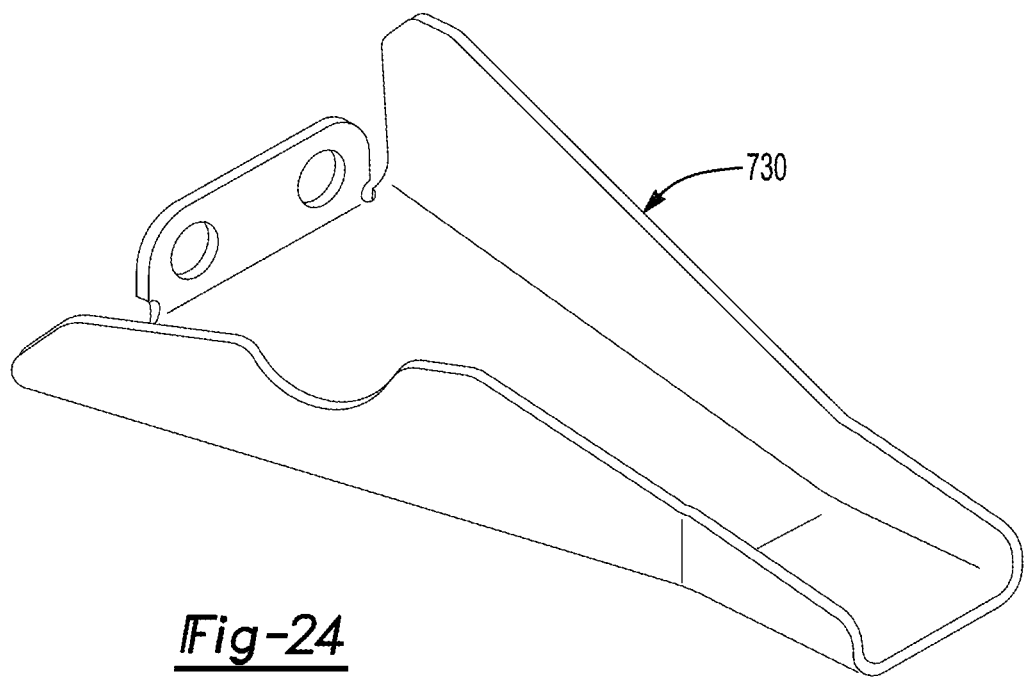
FIG. 24 is a perspective view of an example of the lubricant chute.

Referring to FIGS. 15, 22 and 24, a lubricant chute 730 may be mounted to the wall 654. The lubricant chute 730 may be disposed on the second wall side 682 and thus may be disposed opposite the deflector 700. The lubricant chute 730 may be aligned with or may be disposed adjacent to a lubricant opening 686. As such, the lubricant chute 730 may receive lubricant 56 that passes through the lubricant opening 686 or lubricant 56 that is deflected by the deflector 700 through the lubricant opening 686. In at least one configuration, the lubricant chute 730 may be disposed above the axis 70, above the drive pinion 84, above the shift collar 602 or combinations thereof.

The lubricant chute 730 may extend in a direction that extends away from the wall 654 and toward the shift mechanism housing cover 656. The lubricant chute 730 may slope downward or become progressively closer to the axis 70 as the distance from the wall 654 increases. Optionally, the lubricant chute 730 may become narrower as the distance from the wall 654 increases. As is best shown in FIG. 15, the lubricant chute 730 may be provided with an axial length that may route lubricant 56 past the end of the shift collar 602 that is disposed closest to the shift mechanism housing cover 656. For instance, the lubricant chute 730 may extend away from the wall 654 and past the end of the shift collar 602 that is disposed opposite the drive pinion 84.

Referring to FIG. 15, lubricant that flows off of the end of the lubricant chute 730 may be directed into the shift collar 602 by a cover deflector 740. The cover deflector 740 may extend from the shift mechanism housing cover 656 toward the shift collar 602. In at least one configuration, the cover deflector 740 may be partially or completely disposed below the axis 70 and may have a downward sloping top surface that may help direct lubricant 56 into the shift collar hole 614 and into the support tube hole 644 if a support tube 630 is provided. The free end or distal end of the cover deflector 740 may extend into or may be received inside the shift collar hole 614, which may help increase the amount of lubricant 56 that may enter the shift collar 602 and that may be routed to a support tube lubricant hole 646.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an electric motor module that is operatively connectable to a differential assembly, the electric motor module having a motor housing that receives a rotor that is rotatable about an axis;
    a cover that is mounted to an end of the motor housing, wherein the cover receives a planetary gear set that is operatively connected to the rotor, wherein the planetary gear set includes:
        a planet gear carrier that is rotatable about the axis and that rotatably supports a planet gear that meshes with a planetary ring gear and a sun gear, wherein the planet gear carrier has a first side that faces toward the cover; and
        a lubricant catching ring that extends around the axis and that is mounted to the first side, wherein the lubricant catching ring defines a lubricant catching ring hole and cooperates with the planet gear carrier to define a chamber that captures lubricant that passes through the lubricant catching ring hole; and
    wherein the planet gear is rotatably disposed on a planet pin that defines an axial bore that has a first opening that faces toward the lubricant catching ring and that receives lubricant that is captured by the lubricant catching ring and a second opening that is disposed opposite the first opening, a connecting passage that extends from the axial bore to an outer side of the planet pin that faces away from the axial bore, a first axial bore portion that extends from the first opening toward the second opening, and a second axial bore portion that extends from the second opening to the first axial bore portion, wherein the first axial bore portion has a larger diameter than the second axial bore portion.

2. An axle assembly comprising:
    an electric motor module that is operatively connectable to a differential assembly, the electric motor module having a motor housing that receives a rotor that is rotatable about an axis;
    a cover that is mounted to an end of the motor housing wherein the cover receives a planetary gear set that is operatively connected to the rotor, wherein the planetary gear set includes:
        a planet gear carrier that is rotatable about the axis and that rotatably supports a planet gear that meshes with a planetary ring gear and a sun gear, wherein the planet gear carrier has a first side that faces toward the cover; and
    a washer that is axially positioned between an end of the planet gear and the planet gear carrier, the washer defining a washer hole that receives a planet pin, an outside washer surface that faces away from the washer hole, and an elliptical groove that extends from the washer hole to the outside washer surface.

3. The axle assembly of claim 2 wherein the elliptical groove is provided on a first washer side of the washer and a second elliptical groove is provided on a second washer side of the washer that is disposed opposite the first washer side.

4. The axle assembly of claim 3 wherein the elliptical groove and the second elliptical groove extend in different directions from the washer hole.

5. The axle assembly of claim 2 wherein the washer hole is at least partially defined by an inside washer surface having a circular configuration.

6. The axle assembly of claim 2 wherein the washer hole is at least partially defined by a set of arcuate surfaces configured to contact the planet pin and a set of connecting surfaces that are spaced apart from the planet pin.

7. The axle assembly of claim 6 wherein each member of the set of connecting surfaces extends between an adjacent pair of members of the set of arcuate surfaces.

8. The axle assembly of claim 2 wherein the elliptical groove is at least partially defined by a first elliptical edge that is tangential to the washer hole and intersects the outside washer surface at two points.

9. The axle assembly of claim 2 wherein the elliptical groove is at least partially defined by a second elliptical edge that intersects the washer hole at two points and that is spaced apart from and does not intersect the outside washer surface.

10. An axle assembly comprising:
    an electric motor module that is operatively connectable to a differential assembly, the electric motor module having a motor housing that receives a rotor that is rotatable about an axis;
    a cover that is mounted to an end of the motor housing, wherein the cover receives a planetary gear set that is operatively connected to the rotor and that has a planet gear carrier;
    a shift mechanism housing that is disposed on the cover, wherein the shift mechanism housing has an inner housing side that faces toward the axis and a wall that extends from the inner housing side toward the axis, wherein the wall at least partially defines a lubricant opening and receives a bearing assembly that rotatably supports the planet gear carrier; and
    a deflector that is mounted to the shift mechanism housing proximate the lubricant opening, wherein the deflector is axially positioned between the planetary gear set and the wall, and the deflector directs lubricant through the lubricant opening.

11. The axle assembly of claim 10 wherein rotation of the planetary gear set causes lubricant in the shift mechanism housing to move in a circumferential direction about the axis and the deflector redirects the lubricant in an axial direction and through the lubricant opening.

12. The axle assembly of claim 10 wherein the deflector is mounted to the wall and is spaced apart from the inner housing side.

13. The axle assembly of claim 10 wherein the deflector includes a ring portion that extends continuously around the axis, a stem that extends from the ring portion away from the axis, and an enlarged head disposed at an end of the stem.

14. The axle assembly of claim 13 wherein the stem and the enlarged head cooperate to define a first deflection surface and a second deflection surface that are disposed opposite each other and that are tapered such that the first deflection surface and the second deflection surface become closer together in an axial direction that extends toward the lubricant opening.

15. The axle assembly of claim 10 further comprising a lubricant chute that is disposed on a side of the wall that is disposed opposite the deflector, wherein the lubricant chute receives lubricant that is deflected by the deflector through the lubricant opening.

16. The axle assembly of claim 15 wherein the lubricant chute extends away from the wall and past a shift collar that selectively couples the planetary gear set to a drive pinion that is operatively connected to the differential assembly.

17. The axle assembly of claim 16 wherein a shift mechanism housing cover is disposed proximate an end of the shift mechanism housing, the lubricant chute is disposed above the shift collar, and lubricant that slides off the lubricant chute is directed into the shift collar by a cover deflector that extends from the shift mechanism housing cover toward the shift collar.

18. The axle assembly of claim 17 wherein the shift collar has an inner shift collar side that faces toward the axis and at least partially defines a shift collar hole, an outer shift collar side that is disposed opposite the inner shift collar side, and a shift collar lubricant hole that extends from the inner shift collar side to the outer shift collar side, wherein lubricant exits the shift collar hole via the shift collar lubricant hole.

19. The axle assembly of claim 18 wherein a support tube is received the shift collar hole and is fastened to the drive pinion, the support tube has an inner support tube side that faces toward the axis and at least partially defines a support tube hole, an outer support tube side that is disposed opposite the inner support tube side, and a support tube lubricant hole that extends from the inner support tube side to the outer support tube side, wherein lubricant enters the support tube hole, passes through the support tube lubricant hole, and then passes through the shift collar lubricant hole.

20. The axle assembly of claim 10 wherein the deflector includes a stem and an enlarged head disposed at an end of the stem.

\* \* \* \* \*

UNITED STATES PATENT AND TRADEMARK OFFICE
CERTIFICATE OF CORRECTION

| | |
|---|---|
| PATENT NO. | : 11,326,687 B1 |
| APPLICATION NO. | : 17/122826 |
| DATED | : May 10, 2022 |
| INVENTOR(S) | : Chetankumar Ghatti et al. |

It is certified that error appears in the above-identified patent and that said Letters Patent is hereby corrected as shown below:

In the Claims

Column 21, Lines 48-49, Claim 2:
After "mounted to an end of the motor"
Delete "housing"
Insert --housing,--.

Signed and Sealed this
Fourteenth Day of March, 2023

Katherine Kelly Vidal
*Director of the United States Patent and Trademark Office*